United States Patent
Lieutier et al.

(10) Patent No.: US 11,776,214 B2
(45) Date of Patent: Oct. 3, 2023

(54) 3D RECONSTRUCTION OF A STRUCTURE OF A REAL SCENE WITH AN OPEN SURFACE

(71) Applicant: DASSAULT SYSTEMES, Velizy Villacoublay (FR)

(72) Inventors: André Lieutier, Aix-en-Provence (FR); Julien Vuillamy, Aix-en-Provence (FR); David Cohen-Steiner, Sophia-Antipolis (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 43 days.

(21) Appl. No.: 17/519,373

(22) Filed: Nov. 4, 2021

(65) Prior Publication Data
US 2022/0139038 A1    May 5, 2022

(30) Foreign Application Priority Data
Nov. 4, 2020  (EP) .................................... 20306324

(51) Int. Cl.
*G06T 17/20* (2006.01)
*G06T 19/20* (2011.01)

(52) U.S. Cl.
CPC ............ *G06T 17/205* (2013.01); *G06T 19/20* (2013.01); *G06T 2210/21* (2013.01); *G06T 2219/004* (2013.01)

(58) Field of Classification Search
None
See application file for complete search history.

(56) References Cited

U.S. PATENT DOCUMENTS

| 6,184,897 B1 * | 2/2001 | Gueziec ................. G06T 17/20 345/440 |
| 6,307,551 B1 * | 10/2001 | Gueziec ................. G06T 17/20 345/419 |

(Continued)

FOREIGN PATENT DOCUMENTS

EP    3 723 052 A1    10/2020

OTHER PUBLICATIONS

Li, Ping, Rene Klein Gunnewiek, and Peter HN de With. "Scene reconstruction using MRF optimization with image content adaptive energy functions." Advanced Concepts for Intelligent Vision Systems: 10th International Conference, ACIVS 2008, Juan-les-Pins, France, Oct. 20-24, 2008. Proceedings 10. Springer Berlin.*

(Continued)

*Primary Examiner* — Ryan M Gray
(74) *Attorney, Agent, or Firm* — Oblon, McClelland, Maier & Neustadt, L.L.P.

(57) ABSTRACT

A 3D reconstruction method including obtaining a first open triangulated surface consisting of triangles of a tetrahedral meshing of a point cloud and determining a second open triangulated surface. The determining explores candidate open triangulated surfaces each being a set of triangles of the meshing and penalizes a high rank of the candidates according to a lexicographic order based on a triangle order and ordering a candidate having triangles decreasingly ordered according to a triangle order penalizing triangle size, relative to another candidate having triangles decreasingly ordered according to the triangle order. The second surface violates consistency of a labelling of the meshing with two labels. A triangle respects labelling consistency when it belongs to the first surface and separates two tetrahedrons having different labels, or when it does not belong to the first surface and separates two tetrahedrons having a same label.

17 Claims, 19 Drawing Sheets

(56) References Cited

U.S. PATENT DOCUMENTS

| | | |
|---|---|---|
| 6,377,865 B1 | 4/2002 | Edelsbrunner et al. |
| 2019/0019331 A1* | 1/2019 | Alliez .................. G06F 17/17 |
| 2019/0197775 A1* | 6/2019 | Sanchez Bermudez .................. G06T 17/30 |

OTHER PUBLICATIONS

Gao, Shang, and Changbao Wang. "A new algorithm for the smallest enclosing circle." 2018 8th International Conference on Management, Education and Information (MEICI 2018). Atlantis Press, 2018.*

Lafarge, Florent, and Pierre Alliez. "Surface reconstruction through point set structuring." Computer Graphics Forum. vol. 32. No. 2pt2. Oxford, UK: Blackwell Publishing Ltd, 2013.*

Dahu, Song, and Li Zhongke. "A fast surface reconstruction algorithm based on Delaunay." 2012 International Conference on Computer Science and Information Processing (CSIP). IEEE, 2012.*

Matthew Berger, et al.; "State of the Art in Surface Reconstruction from Point Clouds"; Star-State of the Art Report; Hal Id: hal-01017700; https://hal.inria.fr/hal-01017700; 2014; 27 pgs.

F. Cazals, J. Giesen, Delaunay triangulation based surface reconstruction, Effective computational geometry for curves and surfaces, pp. 231-276, 2006.

Alexander Hornung, et al.; "Robust Reconstruction of Watertight 3D Models from Non-uniformly Sampled Point Clouds Without Normal Information"; Eurographics Symposium on Geometry Processing (2006); 10 pgs.

B. A Galler, and M. J Fisher. An improved equivalence algorithm. Communications of the ACM, 7(5):301-303, 1964. (3 pgs.).

L. Chen, J.C. Xu, Optimal Delaunay triangulations, Journal of Computational Mathematics, vol. 22, No. 2, 2004, 299-308. (10 pgs.).

C. Couprie, L. Grady, L. Najman, H. Talbot, Power Watersheds: A Unifying Graph-Based Optimization Framework, HAL Id: hal-00622510., IEEE Transactions on Pattern Analysis and Machine Intelligence, Institute of Electrical and Electronics Engineers, 2011, 33 (7), pp. 1384-1399. (18 pgs.).

H. Edelsbrunner, Surface reconstruction by wrapping finite sets in space. Discrete and computational geometry, vol. 2, pp. 379-404. Springer, 2003.

Jiachang Xu et al: "Attitude Optimization Control of Unmanned Helicopter in Coal Mine Using Membrane Computing", Mathematical Problems in Engineering, vol. 2020, May 11, 2020. (11 pgs.).

Pierre Alliez, David Cohen-Steiner, Mariette Yvinec, and Mathieu Desbrun. Variational tetrahedral meshing. ACM Trans. Graph., 24(3):617-625, 2005. doi: 10. 1145/ 1073204. 1073238. (10 pgs.).

Nina Amenta, Marshall W. Bern, and Manolis Kamvysselis. A new voronoi-based surface reconstruction algorithm. In Proceedings of the 25th Annual Conference on Computer Graphics and Interactive Techniques, SIGGRAPH 1998, Orlando, FL, USA, Jul. 19-24, 1998, pp. 415-421, 1998. doi: 10. 1145/ 280814. 280947.

Nina Amenta, Sunghee Choi, Tamal K. Dey, and N. Leekha. A simple algorithm for homeomorphic surface reconstruction. Int. J. Comput. Geometry Appl., 12(1-2):125-141, 2002. doi: 10. 1142/ S0218195902000773.

Jean-Daniel Boissonnat, Geometric structures for three-dimensional shape representation. ACM Trans. Graph., 3(4):266-286, 1984. doi: 10. 1145/ 357346. 357349. (21 pgs.).

Jean-Daniel Boissonnat and Frédéric Cazals. Smooth surface reconstruction via natural neighbour interpolation of distance functions. In Proceedings of the Sixteenth Annual Symposium on Computational Geometry, Clear Water Bay, Hong Kong, China, Jun. 12-14, 2000, pp. 223-232, 2000. doi: 10. 1145/ 336154. 336208.

J Frederico Carvalho, et al. An algorithm for calculating top-dimensional bounding chains. PeerJ Computer Science, 4:e153, 2018. (12 pgs.).

Erin W. Chambers, Jeff Erickson, and Amir Nayyeri. Minimum cuts and shortest homologous cycles. In Proceedings of the 25th ACM Symposium on Computational Geometry, Aarhus, Denmark, Jun. 8-10, 2009, pp. 377-385, 2009. doi: 10. 1145/ 1542362. 1542426. (15 pgs.).

Erin Wolf Chambers and Mikael Vejdemo-Johansson. Computing minimum area homologies. In Computer graphics forum, vol. 34, pp. 13-21. Wley Online Library, 2015.

Bernard Chazelle. A minimum spanning tree algorithm with inverse-ackermann type complexity. Journal of the ACM (JACM), 47(6):1028-1047, 2000. (20 pgs.).

Chao Chen, et al. Quantifying homology classes. CoRR, abs/0802. 2865, arXiv: 0802. 2865., STACS 2008, Feb. 2008, Bordeaux, France. pp. 169-180. hal-00256542 (13 pgs.).

Chao Chen and Daniel Freedman. Measuring and computing natural generators for homology groups. Comput. Geom., 43(2):169-181, 2010. doi: 10. 1016/j. comgeo. 2009. 06. 004. (13 pgs.).

Long Chen. Mesh smoothing schemes based on optimal delaunay triangulations. In Proceedings of the 13th International Meshing Roundtable, IMR 2004, Williamsburg, Virginia, USA, Sep. 19-22, 2004, pp. 109-120, 2004. URL: http: // imr. sandia. gov/ papers/ abstracts/ Ch317.

Long Chen and Michael Holst. Efficient mesh optimization schemes based on optimal delaunay triangulations. Computer Methods in Applied Mechanics and Engineering, 200(9):967-984, 2011. doi: https: // doi. org/ 10. 1016/j. cma. 2010. 11. 007. (18 pgs.).

David Cohen-Steiner, et al., "Lexicographic optimal chains and manifold triangulations." Research Report HAL: hal-02391190, Dec. 3, 2019., 1-102, Cohen-Steiner David et al: "Lexicographic optimal chains and manifold triangulations", XP055798946, Retrieved from the Internet: URL:https://hal.archives-ouvertes.fr/hal-0 2391190/ document [retrieved on Apr. 26, 2021].

David Cohen-Steiner, Andre Lieutier, and Julien Vuillamy. Regular triangulations as lexicographic optimal chains. Preprint HAL: hal-02391285, 2019.

Tamal K. Dey and Samrat Goswami. Tight cocone: A water-tight surface reconstructor. J. Comput. Inf. Sci. Eng., 3(4):302-307, 2003. (8 pgs.).

Tamal K. Dey, Anil N. Hirani, and Bala Krishnamoorthy. Optimal homologous cycles, total unimodularity, and linear programming. SIAM J. Comput., 40(4):1026-1044, 2011. doi: 10. 1137/ 100800245.

Tamal K. Dey, Tao Hou, and Sayan Mandal. Computing minimal persistent cycles: Polynomial and hard cases. CoRR, abs/1907. 04889, 2019. URL: http: // arxiv. org/ abs/ 1907. 04889, arXiv: 1907. 04889., pp. 2587-2606. (20 pgs.).

Tamal K. Dey, Jian Sun, and Yusu Wang. Approximating loops in a shortest homology basis from point data. In David G. Kirkpatrick and Joseph S. B. Mitchell, editors, Proceedings of the 26th ACM Symposium on Computational Geometry, Snowbird, Utah, USA, Jun. 13-16, 2010, pp. 166-175. ACM, 2010. doi: 10. 1145/ 1810959. 1810989.

Jack Edmonds and Richard M. Karp. Theoretical improvements in algorithmic efficiency for network flow problems. J. ACM, 19(2):248-264, 1972. doi: 10. 1145/321694. 321699. (17 pgs).

Jeff Erickson and Kim Whittlesey. Greedy optimal homotopy and homology generators. In Proceedings of the Sixteenth Annual ACM-SIAM Symposium on Discrete Algorithms, SODA 2005, Vancouver, British Columbia, Canada, Jan. 23-25, 2005, pp. 1038-1046, 2005. URL: http: // di. acm. org/ citation, cfm? id= 1070432. 1070581. (9 pgs.).

Michael M. Kazhdan, et al., "Screened poisson surface reconstruction", ACM Trans. Graph., 32(3):29:1-29:13, 2013. doi: 10. 1145/ 2487228. 2487237. (13 pgs.).

Patrick Labatut, Jean-Philippe Pons, and Renaud Keriven. Robust and efficient surface reconstruction from range data. Comput. Graph. Forum, 28(8):2275-2290, 2009. doi: 10. 1111/j. 1467-8659. 2009. 01530. (16 pgs.).

H. Schäfer, et al, Sylvain Lefebvre and Michela Spagnuolo, editors., "State of the Art Report on Real Time with Hardware Tesselation" *Eurographics 2014*—State of the Art Report, Strasbourg, France, Apr. 7-11, 2014. Eurographics Association, 2014. URL: https:// diglib. eg. org/ handle/ 10. 2312/ 7707. (25 pgs).

Yangyan Li, et al., Globfit: consistently fitting primitives by discovering global relations. ACM Trans. Graph., 30(4):52, 2011. doi: 10. 1145/2010324. 1964947. (12 pgs.).

(56) References Cited

OTHER PUBLICATIONS

James B. Orlin. Max flows in o(nm) time, or better. In Symposium on Theory of Computing Conference, STOC'13, Palo Alto, CA, USA, Jun. 1-4, 2013, pp. 765-774, 2013. doi: 10. 1145/2488608. 2488705. (10 pgs.).

John Matthew Sullivan. A Crystalline Approximation Theorem for Hypersurfaces. PhD thesis, Princeton Univ., Oct. 1990. URL: http: // torus, math. uiuc. edu/ jms/ Papers/thesis/. (106 pgs.).

Robert Endre Tarjan, et al., "Worst-case analysis of set union algorithms.", J. ACM, 31(2):245-281, 1984. doi: 10. 1145/ 62. 2160. (37 pgs.).

Pengxiang Wu, et al., Optimal topological cycles and their application in cardiac trabeculae restoration. In International Conference on Information Processing in Medical Imaging, pp. 80-92. Springer, 2017. (12 pgs.).

J-D. Boissonnat, et al.; "Algorithmic Geometry"; Cambridge University Press; New York, NY, USA, 1995.

S.H, Lo, "Parallel Delaunay triangulation in three dimensions." Comput. Methods Appl. Mech. Engrg., 237-240 (2012) 88-106. (19 pgs.).

Song Dahu et al: "A fast surface reconstruction algorithm based on Delaunay", Computer Science and Information Processing (CSIP), 2012 International Conference On, IEEE, Aug. 24, 2012. (4 pgs.).

Extended European Search Report dated May 10, 2021, in European Patent Application No. 20306324.3 filed Nov. 4, 2020.

\* cited by examiner

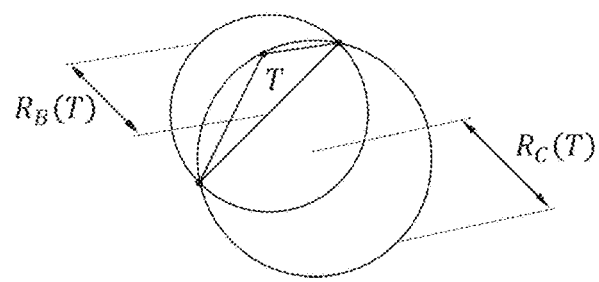
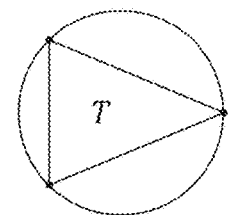
FIG. 2
FIG. 3
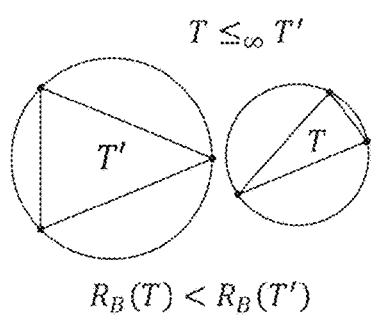
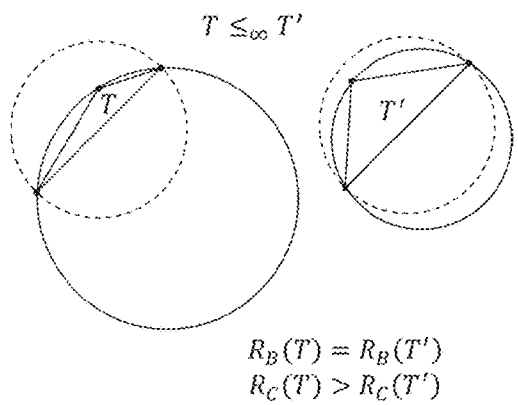
FIG. 4
FIG. 5

Input

```
Inputs : G = (V, E, π) with E = {e_i, i = 1, ..., n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

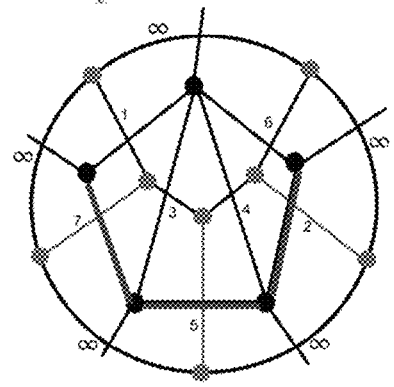

FIG. 11

```
Inputs : G = (V, E, π) with E = {e_i, i = 1, ..., n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

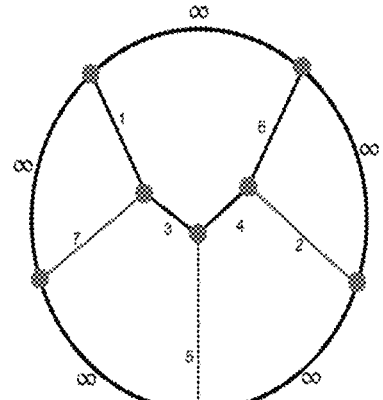

FIG. 12

```
Inputs  : G = (V, E, π) with E = {e_i, i = 1, ..., n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

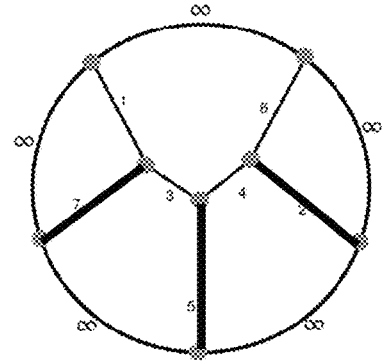

FIG. 13

```
→ algorithm is running
Inputs  : G = (V, E, π) with E = {e_i, i = 1, ..., n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

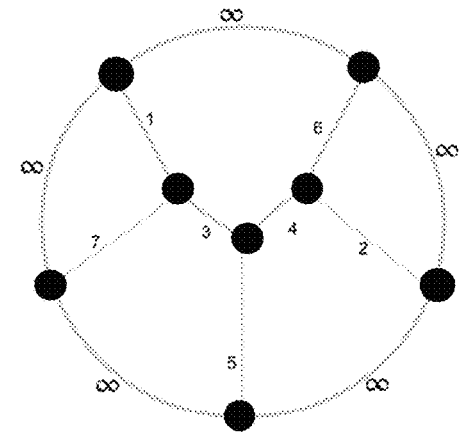

$\Gamma_{min} = \emptyset$

FIG. 14

```
→ algorithm is running
```
Inputs : $G = (\mathcal{V}, \mathcal{E}, \pi)$ with $\mathcal{E} = \{e_i, i = 1, \ldots, n\}$
Output : $\Gamma_{min}$
$\Gamma_{min} \leftarrow \emptyset$
for $v \in \mathcal{V}$ do
   MakeSet($v$)
   $\mathcal{L}(v) = b$
end
for $e \in \mathcal{E}$ in decreasing order do
   $e = (v_1, v_2) \in \mathcal{V} \times \mathcal{V}$
   $r_1 \leftarrow$ FindSet($v_1$), $r_2 \leftarrow$ FindSet($v_2$)
   if $r_1 = r_2$ then
     if $\mathcal{L}(v_2) \neq \pi(e)(\mathcal{L}(v_1))$ then
       $\Gamma_{min} \leftarrow \Gamma_{min} \cup e$
     end
   else
     if $\mathcal{L}(v_2) \neq \pi(e)(\mathcal{L}(v_1))$ then
       SwapCC($r_2$)
     end
     UnionSet($r_1, r_2$)
end

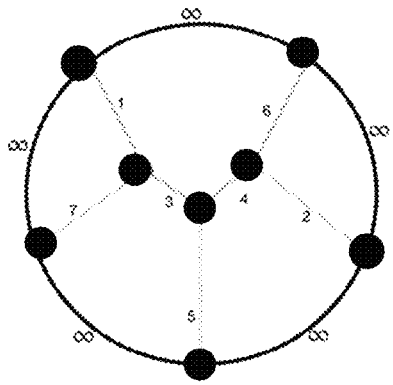

$\Gamma_{min} = \emptyset$

FIG. 15

```
→ algorithm is running
```
Inputs : $G = (\mathcal{V}, \mathcal{E}, \pi)$ with $\mathcal{E} = \{e_i, i = 1, \ldots, n\}$
Output : $\Gamma_{min}$
$\Gamma_{min} \leftarrow \emptyset$
for $v \in \mathcal{V}$ do
   MakeSet($v$)
   $\mathcal{L}(v) = b$
end
for $e \in \mathcal{E}$ in decreasing order do
   $e = (v_1, v_2) \in \mathcal{V} \times \mathcal{V}$
   $r_1 \leftarrow$ FindSet($v_1$), $r_2 \leftarrow$ FindSet($v_2$)
   if $r_1 = r_2$ then
     if $\mathcal{L}(v_2) \neq \pi(e)(\mathcal{L}(v_1))$ then
       $\Gamma_{min} \leftarrow \Gamma_{min} \cup e$
     end
   else
     if $\mathcal{L}(v_2) \neq \pi(e)(\mathcal{L}(v_1))$ then
       SwapCC($r_2$)
     end
     UnionSet($r_1, r_2$)
end

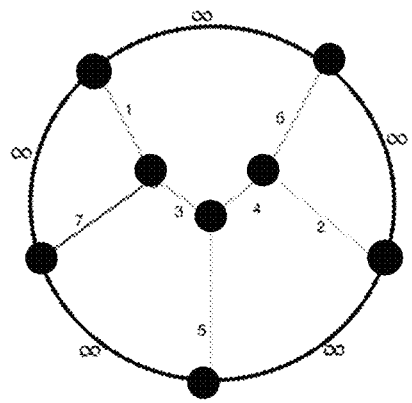

$\Gamma_{min} = \emptyset$

FIG. 16

```
→ algorithm is running
Inputs : G = (V, E, π) with E = {e_i, i = 1,...,n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

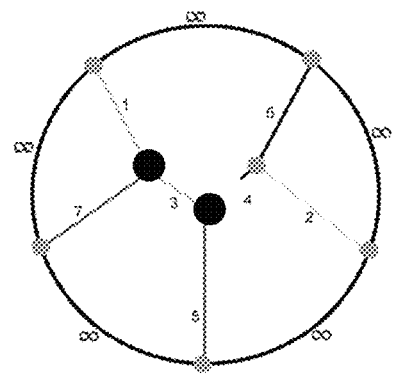

$\Gamma_{min} = \{e_4\}$

FIG. 23

```
→ algorithm is running
Inputs : G = (V, E, π) with E = {e_i, i = 1,...,n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

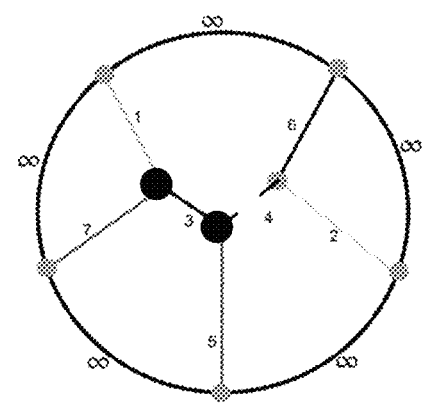

$\Gamma_{min} = \{e_4\}$

FIG. 24

```
→ algorithm reached end
───────────────────────────────────────
Inputs  : G = (V, E, π) with E = {eᵢ, i = 1, ..., n}
Output : Γ_min
Γ_min ← ∅
for v ∈ V do
 | MakeSet(v)
 | L(v) = b
end
for e ∈ E in decreasing order do
 | e = (v₁, v₂) ∈ V × V
 | r₁ ← FindSet(v₁), r₂ ← FindSet(v₂)
 | if r₁ = r₂ then
 |  | if L(v₂) ≠ π(e)(L(v₁)) then
 |  |  | Γ_min ← Γ_min ∪ e
 |  | end
 | else
 |  | if L(v₂) ≠ π(e)(L(v₁)) then
 |  |  | SwapCC(r₂)
 |  | end
 |  | UnionSet(r₁, r₂)
end
```

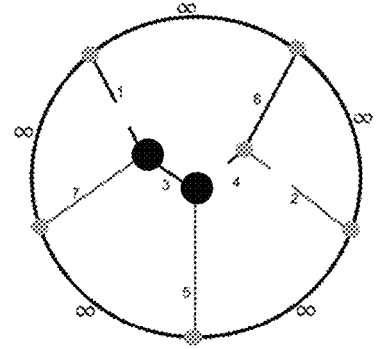

FIG. 29

```
Inputs  : G = (V, E, π) with E = {eᵢ, i = 1, ..., n}
Output : Γ_min
Γ_min ← ∅
for v ∈ V do
 | MakeSet(v)
 | L(v) = b
end
for e ∈ E in decreasing order do
 | e = (v₁, v₂) ∈ V × V
 | r₁ ← FindSet(v₁), r₂ ← FindSet(v₂)
 | if r₁ = r₂ then
 |  | if L(v₂) ≠ π(e)(L(v₁)) then
 |  |  | Γ_min ← Γ_min ∪ e
 |  | end
 | else
 |  | if L(v₂) ≠ π(e)(L(v₁)) then
 |  |  | SwapCC(r₂)
 |  | end
 |  | UnionSet(r₁, r₂)
end
```

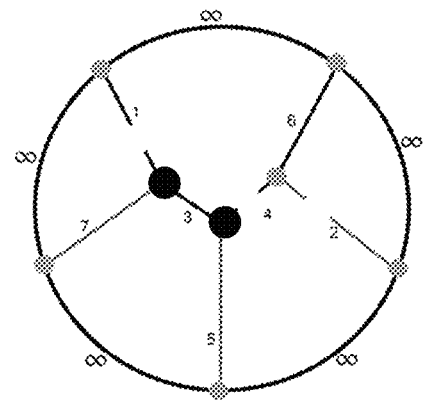

$\Gamma_{min} = \{e_4, e_2, e_1\}$ = Output

FIG. 30

```
Inputs  : G = (V, E, π) with E = {e_i, i = 1,...,n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

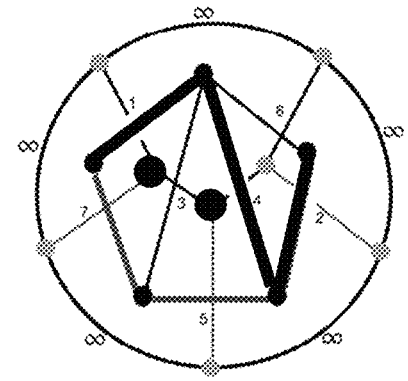

$\Gamma_{min} = \{e_4, e_2, e_1\}$ = Output

FIG. 31

```
Inputs  : G = (V, E, π) with E = {e_i, i = 1,...,n}
Output : Γ_min
Γ_min ← ∅
for v ∈ V do
    MakeSet(v)
    L(v) = b
end
for e ∈ E in decreasing order do
    e = (v_1, v_2) ∈ V × V
    r_1 ← FindSet(v_1), r_2 ← FindSet(v_2)
    if r_1 = r_2 then
        if L(v_2) ≠ π(e)(L(v_1)) then
            Γ_min ← Γ_min ∪ e
        end
    else
        if L(v_2) ≠ π(e)(L(v_1)) then
            SwapCC(r_2)
        end
        UnionSet(r_1, r_2)
end
```

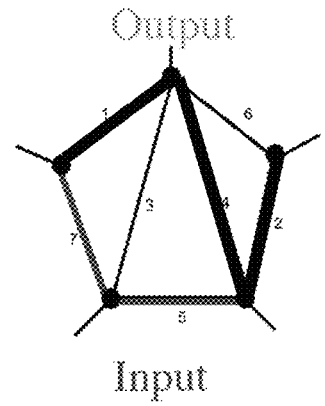

$\Gamma_{min} = \{e_4, e_2, e_1\}$ = Output

FIG. 32

3D RECONSTRUCTION OF A STRUCTURE OF A REAL SCENE WITH AN OPEN SURFACE

CROSS-REFERENCE TO RELATED APPLICATIONS

This application claims priority under 35 U.S.C. § 119 or 365 to European Application No. 20306324.3, filed Nov. 4, 2020. The entire contents of the above application(s) are incorporated herein by reference.

FIELD

The disclosure relates to the field of computer programs and systems, and more specifically to a method, system and program for 3D reconstruction of a structure of a real scene.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, 3D reconstruction of a structure of a real scene is gaining wide importance.

Existing methods for 3D reconstruction of a structure of a real scene suffer from several drawbacks.

In this context, there is a need for an improved method for 3D reconstruction of a structure of a real scene.

SUMMARY

It is therefore provided a computer-implemented method for 3D reconstruction of a structure of a real scene. The method comprises providing a first open triangulated surface. The first open triangulated surface is a set of triangles of a tetrahedral meshing of a 3D point cloud. The 3D point cloud represents at least a part of a structure. The method further comprises determining a second open triangulated surface. The second open triangulated surface represents a skin of a portion of the structure. The determining explores candidate open triangulated surfaces each being a set of triangles of the tetrahedral meshing. The determining penalizes a high rank of the candidate open triangulated surfaces according to a lexicographic order. The lexicographic order is based on a triangle order. The lexicographic order orders a first candidate open triangulated surface having first triangles which are ordered according to a decreasing rank of the triangle order, relative to a second candidate open triangulated surface having second triangles which are ordered according to a decreasing rank of the triangle order. The triangle order penalizes a triangle size. The determined second open triangulated surface violates consistency of a labelling of the tetrahedral meshing with two given labels. A triangle respects consistency of the labelling if the triangle belongs to the first open triangulated surface and separates two tetrahedrons having different labels, or if the triangle does not belong to the first open triangulated surface and separates two tetrahedrons having a same label.

The method may comprise one or more of the following:

- the tetrahedral meshing presents the following properties:
  - the union of the tetrahedrons of the tetrahedral meshing forms the convex envelop of the points of the point cloud; and
  - the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron;
- the triangle order penalizes, for a respective triangle, a high value of the radius of the smallest enclosing circle;
- the triangle order further penalizes, for a first triangle and a second triangle having a same smallest enclosing circle, a small value of the radius of the circumscribed circle;
- the tetrahedral meshing is a regular triangulation;
- the exploring and the penalizing comprise:
  - visiting triangles of the tetrahedral meshing according to a decreasing rank of the triangle order; and
  - discarding visited triangles having a high rank of the triangle order as long as consistency of the labelling can be preserved;
- the discarding comprises, for each visited triangle, if the triangle violates consistency of the labelling, either rewarding the triangle, either adapting the labelling to respect consistency;
- the discarding further comprises, for each visited triangle:
  - if the triangle separates two tetrahedrons that are in a same connected component and if the triangle violates consistency of the labelling, rewarding the triangle;
  - if the triangle separates two tetrahedrons that are in different connected components:
    - if the triangle violates consistency of the labelling, switching the label of one of the connected components and merging the connected components,
    - if the triangle respects consistency of the labelling, merging the connected components;
- the providing of the first open triangulated surface comprises:
  - providing one or more loops in the tetrahedral meshing; and determining an open triangulated surface in the tetrahedral meshing having the one or more loops as boundary;

the structure comprises at least one corner structure;

the 3D point cloud stems from photogrammetry, laser-scan, lidar measurements, RGB-D measurements and/or medical or industrial tomography; and/or the 3D point cloud represents a portion of a closed shape, and/or a ratio between the number of points of the 3D point cloud and the memory size of the computer is larger than a predefined threshold.

It is further provided a computer program comprising instructions for performing the method.

It is further provided a computer readable storage medium having recorded thereon the computer program.

It is further provided a computer comprising a processor coupled to a memory and, the memory having recorded thereon the computer program.

BRIEF DESCRIPTION OF THE DRAWINGS

Embodiments will now be described, by way of non-limiting example, and in reference to the accompanying drawings, where:

FIGS. 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41 and 42 illustrate the method.

DETAILED DESCRIPTION

Figure 1:
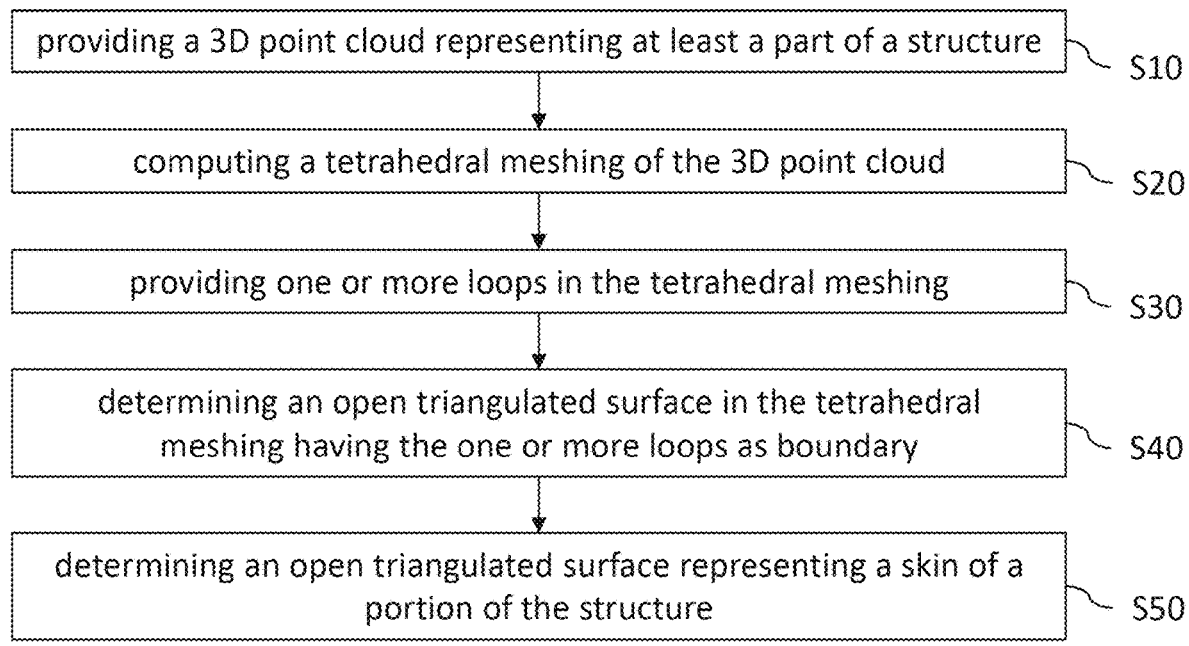
FIG. 1 shows a flowchart of an example of the method.

With reference to the flowchart of FIG. 1, it is proposed a computer-implemented method for 3D reconstruction of a structure of a real scene. The method comprises providing S10-S40 a first open triangulated surface. The first open triangulated surface is a set of triangles of a tetrahedral meshing of a 3D point cloud. The 3D point cloud represents at least a part of a structure. The method further comprises determining S50 a second open triangulated surface. The second open triangulated surface represents a skin of a portion of the structure. The determining S50 explores candidate open triangulated surfaces each being a set of triangles of the tetrahedral meshing. The determining S50 penalizes a high rank of the candidate open triangulated surfaces according to a lexicographic order. The lexicographic order is based on a triangle order. The lexicographic order orders a first candidate open triangulated surface having first triangles which are ordered according to a decreasing rank of the triangle order, relative to a second candidate open triangulated surface having second triangles which are ordered according to a decreasing rank of the triangle order. The triangle order penalizes a triangle size. The determined second open triangulated surface violates consistency of a labelling of the tetrahedral meshing with two given labels. A triangle respects consistency of the labelling if the triangle belongs to the first open triangulated surface and separates two tetrahedrons having different labels, or if the triangle does not belong to the first open triangulated surface and separates two tetrahedrons having a same label.

This constitutes an improved method for 3D reconstruction of a structure of a real scene.

Notably, the method allows to determine an open triangulated surface (i.e. the second one) representing a skin of a portion of a structure of a real scene. Thereby, the method performs reconstruction of a portion of a 3D structure of a real scene. Furthermore, the method does so without requiring smoothness hypothesis on the 3D point cloud and/or on the structure. The method is thus robust and can for example handle different real scene structures. The method may for example handle non-regular point clouds, representing non-regular structures such as corner structures. Also, the method does so with a low amount of (e.g. without any) manually tuning of parameters, which makes it ergonomic. Notably the exploring and the penalizing may be carried out automatically.

The method determines the second open triangulated surface representing the skin of a portion of the structure by exploring candidate open triangulated surfaces and rewarding (e.g. selecting) a candidate that will be the determined open triangulated surface. The method rewards/selects a candidate given two constraints. The first constraint is that the candidate should not have a too high rank in the lexicographic order, otherwise it will be penalized (i.e. discarded) by the determining S50. In other words, the candidate should minimize or tend to minimize the lexicographic order among the candidates. The second constraint is that the candidate must violate consistency of the labelling (i.e. all the triangles of the candidate must violate consistency of the labelling). In other words, the method finds a candidate open triangulated surface, i.e. a set of triangles of the tetrahedral meshing, which violates consistency of the labelling, but which is the least penalized by its rank in the lexicographic order among the candidates. In yet other words, the method determines an open triangulated surface which violates consistency of the labelling, but which is a minimum, or at least tends to be a minimum, for the lexicographic order among open triangulated surfaces violating consistency of the labelling. In yet other words, the method tends to minimize the lexicographic order among the set of open triangulated surfaces violating consistency of the labelling.

Now, the constraint that the determined second open triangulated surface must violate consistency of the labelling captures the constraint that the determined second open triangulated surface must have the same boundary as the first open triangulated surface. In other words, by determining an open triangulated surface which violates labelling consistency, the method determines an open triangulated surface having the same boundary as the first open triangulated surface. By determining an open triangulated surface which does so while minimizing, or at least tending to minimize, the lexicographic order, the method in fact determines an open triangulated surface having a same boundary as the first open triangulated surface and minimizing, or at least tending to minimize, the lexicographic order among open triangulated surfaces having a same boundary as the first open triangulated surface.

As further explained hereinafter, the constraint that the determined second open triangulated surface must have the same boundary as the first open surface is indeed captured by the constraint that the determined second open triangulated surface must violate consistency of the labelling, i.e. must have all its triangles violating consistency of the labelling, given that labelling consistency is defined by the constraint that a triangle respects consistency of the labelling if the triangle belongs to the first open triangulated surface and separates two tetrahedrons having different labels, or if the triangle does not belong to the first open triangulated surface and separates two tetrahedrons having a same label.

As further explained hereinafter, having a high rank in the lexicographic order, for a triangulated surface, captures the fact that the surface includes triangles of large size (e.g. large and/or flat triangles), and/or a too large amount of such triangles. These triangles are representative of regions of the 3D point cloud featuring noise, e.g. comprising outlier points which may stem from measurements errors of sensors that have acquired the point cloud. In other words, an open triangulated surface with a high rank in the lexicographic order does not represent accurately a skin of a portion of the structure, as the skin should rather mesh a high-density portion of the point cloud, as discussed hereinafter. Conversely, an open triangulated surface having a low rank represents the skin accurately. Therefore, the method, based on the first open triangulated surface, finds a second open triangulated surface which has the same boundary, but which represents better the skin of the portion of the structure than the first open triangulated surface.

The method may be used to perform 3D reconstruction a real scene partially represented by a 3D point cloud. Specifically, physical constraints of real-scenes, e.g. occlusions and/or optical properties, can result in that the 3D point cloud represents only partially a structure of the real scene, i.e. represents at least a part of the structure. The physical constraints may indeed lead to partial and incomplete 3D acquisitions, e.g. featuring holes. In other words, the 3D point clouds may feature holes where it should have comprised points representing a part of the structure. In yet other words, the 3D point cloud may represent a portion of a closed shape, i.e. instead of representing the whole closed shape. This may for example be the case when the 3D point cloud is to represent a building, but due to physical constraints, 3D acquisition of a complete shape of the building as a 3D point cloud cannot be carried out, such that only a 3D point cloud representing partially the building shape may be acquired. Nevertheless, in such cases, the method allows accurate and free-hole 3D reconstruction. The method may for example provide as the first open triangulated surface an open triangulated surface having as a boundary the boundary of a part of the structure represented by the 3D point cloud. This boundary may not correspond to the real-world outer boundary of the structure due to a partial 3D acquisition. In other words, this boundary may be a delimitation of a part of the structure that is represented by the 3D point cloud. The method may provide as the first open triangulated surface any such open triangulated surface.

A user may for example define/mark the boundary as a one or more loop (e.g. one) in the tetrahedral meshing, a loop being a set of edges and vertices where each vertex belongs to an even number of edges, and the method may infer the first open triangulated surface from the one or more loops. The method may do so in any manner, including any manner that results in the first open triangulated surface not representing accurately the skin, i.e. by having a too high rank in the lexicographic order. Then, the determining S50 finds another open triangulated surface (i.e. the second) having the same boundary as the first open triangulated surface, but tending to be minimal for the lexicographic order, thereby forming a skin of a portion of the structure with higher quality. In other words, based on a user-provided definition of a boundary of a portion of the structure, the method may determine an open triangulated surface having the defined boundary of the portion as boundary and tending to be minimal for the lexicographic order, thereby forming an accurate skin of the portion of the structure.

The method may additionally or alternatively be used to determine the skin of large 3D point clouds, i.e. point clouds featuring a large number of points, e.g. for which a ratio between the number of points of the 3D point cloud and the memory size of the computer is larger than a predefined threshold. This may for example be the case when the point cloud represents a large terrain. The size of such a point cloud, in terms of number of points, may render the computation of a triangulated surface representing the full skin of the point cloud impossible or at least complicated to do in an acceptable time for a standard or cheap computer. The method may nevertheless allow to handle these point clouds by considering a division of such a point cloud. Specifically, the method may provide as a first open triangulated surface an open surface representing only a skin of a bounded portion of the structure represented by the 3D point cloud. This first open triangulated surface may be inferred from one or more loops provided by a user, e.g. the loops each delimiting such a bounded portion. For example, if the 3D point cloud represents a terrain, the first open triangulated surface may represent a skin of a bounded parcel of the terrain. The first open triangulated surface may represent the skin inaccurately, i.e. by having a too high rank in the lexicographic order. The method then determines as the second open triangulated surface an open triangulated surface which has the same boundary as the first open triangulated surface, but which has a lower rank in the lexicographic order, thereby representing accurately the skin of the bounded portion. The method may do so for each one of several bounded portions altogether dividing the structure.

In other words, the method allows to consider a large structure that can be divided by bounded portions, such as a terrain divided in parcels, and to determine for each portion a respective skin of the portion. This avoids determining the whole skin of the structure in a single process, which would take too long and/or would be impossible to do for a standard or cheap computer. The method may also define the boundaries of the bounded portions (e.g. when providing the corresponding first open triangulated surfaces or loops) to be watertight. This allows to parallelize the skin of the structure, i.e. to treat each determined skin of each portion independently from the other. For example, the method may re-compute one of the skins upon a modification of corresponding the portion of the structure, without recomputing the others. In other words, the method may compute and process accurate skins of portions dividing a large structure, such as parcels of a terrain, independently form each other, which allows not only to obtain an accurate skin of the structure, or a least of one or more portions thereof, but also to do so with the resources of standard or cheap computers and in an acceptable time. The division of the structure in portions, e.g. of a terrain in parcels, may be determined by a user, or, alternatively, may be determined automatically, e.g. based on the consideration that for each portion, the points of the 3D point cloud that represent the portion must fit into the computer memory.

The method is now further discussed, still with reference to the flowchart of FIG. 1.

A real scene designates a part of the real world, which may be or may comprise an object or an arrangement of objects. A structure of a real scene is a tangible (e.g. concrete) physical closed shape in the real scene, such as a closed layout of material in the real scene. A portion of the structure is thus a portion of this closed shape. For example, the real scene may be a building e.g. a cathedral. The portion may then be a part of the building, e.g. the cathedral without its roof. Yet another example is a real scene that is a terrain. A portion thereof may be a part of the terrain, e.g. a parcel/plot. A skin of the portion is a hull or envelop of the portion, that is material of the structure forming a contact between opaque matter inside the structure and air and/or matter outside. The portion may have a boundary, such that the skin does not necessarily form a complete delimitation between the outside of the structure and the inside of the structure, but only a portion of such a delimitation. For example, the skin of a portion of a terrain may represent the delimitation between the earth and the air formed by the terrain, but only for a bounded parcel/plot thereof. Yet another example is the skin of a portion of a building, such as a cathedral, which may forms a partial delimitation between the walls of the building and the air (which may be outside air and/or air inside the building).

The method contemplates a tetrahedral meshing of a 3D point cloud representing at least a part of a structure of a real scene, e.g. representing only a portion of the structure. The method may comprise providing S10 the 3D point cloud, e.g. before the providing of the first open triangulated surface. Alternatively, the method may directly provide the first open triangulated surface and/or the tetrahedral meshing, e.g. by retrieving the first open triangulated surface and/or the tetrahedral meshing from a memory on which it/they have been stored further to its/their computation.

A 3D point cloud representing at least a part of a structure of a real scene is herein a data structure in which each point represents a respective geometrical entity positioned in at least a part of the structure of the real scene. Each geometrical entity represents a respective location of the structure in the scene (in other words, a respective portion and/or layout of material constitutive of the structure). The aggregation (i.e. union or juxtaposition) of the geometrical entities represents altogether at least a part of the structure. Any 3D point cloud herein may comprise a number of points higher than 100000, 1000000 or 10000000. Notably, the method may handle a number of points higher than 10000000 on a standard or cheap computer (e.g. 16 Gigabytes of memory). It is to be understood that the 3D point cloud may comprise points which do not represent a respective geometrical entity positioned in the structure. Those points may form or may be part of regions with lower densities of points, as discussed hereinafter. Such a region may for example represent a part of the scene which does not belong to the structure. Some points of the point cloud may also be outliers, that is points stemming from measurement errors and thus not representing geometrical entities of the structure.

The real scene may be an architectural scene such as a building seen from the outside. The structure may here be the closed tangible shape formed by the structure of the building (e.g. the walls and the roof). The skin of a portion of a structure may in this case be made of the surfaces of the structure of the building, e.g. surfaces of the walls and/or the roof, e.g. facing the outside and/or the inside of the building. The real scene may also be any other civil engineering scene, comprising any civil engineering structure (e.g. a tunnel, for example a mining tunnel). The scene may for example be a factory scan, i.e. a scan of the inside of a factory.

Alternatively, the real scene may be a terrain scene. The structure may be the terrain itself, and a skin of a portion of the terrain may be the ground of a parcel of the terrain, having as boundaries the parcel's boundaries.

Alternatively, the real scene may be a mechanical part or an organic tissue, the skin of a portion being for example a part of an outer hull of the mechanical part or of the organic tissue. A mechanical part may be any one of: a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). Additionally or alternatively, a mechanical part may be any one of a molded part (i.e. a part manufactured by a molding manufacturing process), a machined part (i.e. a part manufactured by a machining manufacturing process), a drilled part (i.e. a part manufactured by a drilling manufacturing process), a turned part (i.e. a part manufactured by a turning manufacturing process), a forged part (i.e. a part manufactured by a forging manufacturing process), a stamped part (i.e. a part manufactured by a stamping manufacturing process) and/or a folded part (i.e. a part manufactured by a folding manufacturing process).

In examples, the structure comprises at least one corner structure. A corner structure designates a part of the structure which has or substantially has the shape of a corner. A corner of structure may be a part of the structure which corresponds to a layout of material forming a shape edge or a sharp angle. A corner structure may be a corner of a building, a corner of a terrain parcel, a corner of a tunnel, a corner formed by walls of a room, a corner of a mining tunnel, a corner or a sharp angle in a layout of material constitutive of a mechanical part, or a corner or a sharp angle in a layout of tissue constitutive of an organic tissue. The method is thus robust, as it handles corner structures.

In examples, the 3D point cloud stems from photogrammetry, laser-scan, RGBD measurements and/or medical or industrial tomography.

In the context of the method, a point cloud representing a structure of an architectural/building scene may stem from RGB-D measurements or photogrammetry, and optionally also from a structure-from-motion analysis. A point cloud representing a structure of a mechanical part may stem from industrial tomography or from laser scan. A point cloud representing a structure of a mining scene (or any other similar civil engineering scene) may stem from a laser scan, e.g. of the inside of a mine. A point cloud representing a structure of an organic tissue may stem from medical tomography. A point cloud representing a terrain may stem from lidar measurements.

Any 3D point cloud herein may be determined from physical measurements on the real scene. The providing S10 of the 3D point cloud may notably comprise providing one or more physical sensors each configured for acquiring a respective physical signal and acquiring one or more respective physical signals by operating the one or more physical sensors on the real scene (i.e. scanning the real scene with each sensor). The providing S10 of the 3D point cloud may comprise the automatic determination of the 3D point cloud based on the measurements, according to any known technique. The one or more sensors may comprise a plurality of (e.g. RGB, and/or image or video) cameras and the determination may comprise a structure-from-motion analysis.

The one or more sensors may alternatively or additionally comprise one or more depth sensors (e.g. on an RGB-D camera). The one or more sensors may alternatively or additionally comprise a laser (e.g. a lidar) or an ultrasound emitter-receiver. The one or more sensors may alternatively or additionally comprise one or more tomographic sensors. A tomographic sensor may be a medical or an industrial tomographic sensor.

Alternatively, the providing S10 of the 3D point cloud may comprise accessing a database where the 3D point cloud is stored and retrieving the 3D point cloud from the database. The 3D point cloud may have been acquired by operating one or more physical sensors and determining the 3D point cloud based on measurements acquired by the one or more sensors, as previously described, and then stored in the database, even though the providing S10 may not actually comprise the acquisition of the measurements and the determining of the 3D point cloud. In any case, the providing S10 of the 3D point cloud may be carried out by user action. Providing S10 the 3D point cloud may further comprise displaying the 3D point cloud on a display (e.g. a GUI) of a computer carrying out the method.

The provided 3D point cloud may comprise one or more regions with different densities of points. This means that the density of points within the point cloud may differ from one region of the point cloud to another. The 3D point cloud may for example comprise holes/openings, which stem from physical constraints when the 3D acquisition of the 3D point cloud has been performed, such as occlusions or optical properties. The holes may represent regions which should have comprise a substantial density of points, but which do not due to the physical constraints. The 3D point cloud may thus represent only a portion of a closed shape (i.e. the structure) where it should have represented the full closed shape if it was not for the physical constraints.

A skin of the structure or of a portion thereof may correspond to a region of the point cloud which has the highest density of points, the region for example separating at least a part of the outside form at least a part of the inside. This region may be open, i.e. the region of the point cloud which has the highest density of points may form an open shape having boundaries. The inside and/or the outside may then be regions featuring a lower density of points. In examples, "having the highest density" means that the density of points in the open shape is higher than an ambient noise stemming from measurements. The 3D point cloud may further feature outliers, which are points of the 3D point cloud located in regions with low densities of points and which stem from measurements errors. In other words, outliers are not representative of geometric entities of the real scene but correspond to numerical and/or measurement artefacts. The method nevertheless handles these outliers, which makes the method robust to outliers and/or density variations.

The 3D point cloud may have a large number of points. For example, a ratio between the number of points of the 3D point cloud and the memory size of the computer may be larger than a predefined threshold. For example, the predefined threshold may be larger than 10 million points for 16 Gigabytes of memory size (i.e. substantially the size of a standard or cheap computer memory), e.g. substantially equal or larger than 10 million points for 16 Gigabytes of memory size.

The concept of 3D reconstruction of a structure represented by a 3D point cloud is now briefly discussed. 3D reconstruction of the structure generally designates the action of computing/determining a surface connecting points of the 3D point cloud. The surface may be referred to as "representing a skin of a portion of the structure" as it connects points of the 3D point cloud into an open surface representing a delimitation (e.g. a boundary) between at least a part of the outside of the structure and at least a part of the inside of the structure. The surface thus represents a portion of a hull of the structure, in other words a skin of a portion of the structure. For example, as previously said, the skin may correspond to an open shape of high density of points within the 3D point cloud. The 3D reconstruction of the structure may in this case designate the determining/computing of a surface connecting points of the open shape so as to form an open surface hull of the structure.

As previously said, the method manipulates a tetrahedral meshing of the 3D point cloud that represents at least a part of the structure. The method may comprise computing S20 the tetrahedral meshing. Alternatively, the method may directly provide the first open triangulated surface and/or the tetrahedral meshing, e.g. by retrieving it/them from a memory where it/they have been stored further to its/their computation. The computing S20 of the tetrahedral meshing may be carried out by any known method.

In examples, the tetrahedral meshing presents the following properties: the union of the tetrahedrons of the tetrahedral meshing forms the convex envelop of the points of the 3D point cloud, and the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron. This improves the quality of the meshing, and consequently the quality of the determined open triangulated surface.

In examples the tetrahedral meshing is a regular triangulation. This further improves the quality of the meshing, and consequently the quality of the determined open triangulated surface. As known per se in the field of computational geometry, a regular triangulation of the 3D point cloud is a triangulation induced by shadows of the faces of a polyhedron in one higher dimension (i.e. in dimension 4). Regular triangulation are merely duals of Power Diagrams, see for example: Algorithmic geometry, Jean-Danel Boissonnat and Mariette Yvinec, Cambridge University Press New York, N.Y., USA, which is incorporated herein by reference. The computing S20 of the tetrahedral meshing may comprise computing as the tetrahedral meshing a regular triangulation of the 3D point cloud, by any know method, which may comprise:

lifting the points of the point cloud, i.e. adding a coordinate to each point. This embeds the set of points in a space of which dimension equals the dimension of the original space (i.e. the 3D space to which the 3D point cloud belongs) comprising the set of points plus one;

computing the convex envelop of the lifted set of points;

triangulating, by any known method, the convex envelop, the triangulation resulting in a tetrahedral meshing the following properties: the union of the tetrahedrons of the tetrahedral meshing forms the convex envelop of the lifted set of points, and the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron; and projecting the lower faces of this triangulation of the convex envelop onto the original space.

In examples, the regular triangulation is a Delaunay triangulation. In such cases, the points are lifted to a paraboloid and the lifting is parametrized by the vertical gap between the lifted point and the paraboloid. This further improves the quality of the meshing, and consequently the quality of the determined open triangulated surface. Furthermore, the method performs the 3D reconstruction by going further than just computing a Delaunay triangulation. The method benefits indeed from the quality of the Delaunay tetrahedral meshing but goes beyond by determining S50 among all candidate open triangulated surfaces being made of triangle faces of the Delaunay triangulation, the one that truly represents the skin. In other words the method may select the best representation of the skin among open triangulated surfaces made of triangle faces of a Delaunay tetrahedral meshing. The method may thus make use of the Delaunay tetrahedral convex hull meshing of a 3D point cloud, a concept known and for example detailed in reference F. Cazals, J. Giesen, Delaunay triangulation based surface reconstruction, Effective computational geometry for curves and surfaces, pages 231-276, 2006, which is incorporated by reference. The Delaunay tetrahedral mesh object is a set of tetrahedrons featuring the following properties. The topology is a set of adjacent tetrahedrons such that any triangle is shared by exactly two regions. The first sharing situation is a triangle shared by two adjacent tetrahedrons. The second sharing situation is a triangle shared by a tetrahedron and by the unbounded outside region. Triangles shared by a tetrahedron and the outside region are called boundary triangles. The geometrical property of the Delaunay meshing is that for any tetrahedron, the sphere defined by its four points (named the circumscribed sphere) does not include any other point of the cloud.

The providing of the first open triangulated surface is now discussed.

The first open triangulated surface is a set of triangles of the tetrahedral meshing forming an open triangulated surface, having boundaries. More generally, in the present disclosure, any open triangulated surface is a triangulated surface of tetrahedral meshing, the triangulated surface having a boundary. The first open triangulated surface may be any open triangulated surface representing the skin of the portion of the structure, and thus may be one of the candidates in the determining. The first open triangulated surface may however have a high rank in the lexicographic order, or at least may have a too high rank to be minimal or to tend to be minimal in the lexicographic order. As previously explained, the determining S50 finds then a second open triangulated surface which has the same boundaries than those of the first open triangulated surface, but which minimizes or at least tends to minimize the lexicographic order. Thereby, the quality of the determined open triangulated surface is better than that of the first open triangulated surface, i.e. the determined surface represents the skin better, e.g. comprises no or at least less large and/or flat triangles, representative of low-densities regions of the point cloud and/or of outliers.

The first open triangulated surface may be directly provided, e.g. the method does not compute/determine it, as previously discussed. Alternatively, the providing of the first open triangulated surface may comprise computing/determining the first open triangulated surface. The computing/determining of the first open triangulated surface may consist in applying any method to find an open triangulated surface, in the tetrahedral meshing, which represents, even, roughly the skin of the portion of the structure. In other words, the providing of the first open triangulated surface may consist in finding in the tetrahedral meshing any open triangulated surface representing, even roughly, the skin, i.e. even if this first open triangulated surface has a high rank in the lexicographic order. The determining S50 will then find such an open triangulated surface but that minimizes or tends to minimize the lexicographic order. In yet other words, the providing of the first open triangulated surface may be implemented by any method that finds an open triangulated surface representing even roughly/inaccurately the skin.

In examples, the providing of the first open triangulated surface comprises providing S30 one or more loops in the tetrahedral meshing and determining S40 an open triangulated surface in the tetrahedral meshing having the one or more loops as boundary. A loop herein is a set of edges and vertices in the tetrahedral meshing such that each vertices in the loop belongs to an even number of edges of the loop. The one or more loops form a boundary of the portion of the structure. As previously discussed, the portion of the structure may be the part of the structure that is represented by the 3D point cloud, or a part of this part, and the one or more loops form in this case the boundary of this part.

The boundary may coincide partially, due to partial acquisition of the 3D point cloud, with that of the real shape of the structure. Alternatively or additionally, the boundary may coincide with the boundary of one or more holes in the 3D point cloud, which stem from partial acquisition of the 3D point cloud. For example, one loop may correspond, e.g. partially, the real shape of the boundary of the structure in the real world. Additionally or alternatively, one loop may correspond to the boundary of a hole in the 3D point cloud.

Additionally or alternatively, the portion of the structure may for example correspond to a portion of the 3D point cloud resulting from a division thereof, as previously discussed, the boundary of this portion being then provided as a loop at S30.

The providing S30 of the one or more loops may be carried out by a user, e.g. by graphical user interaction. For example, for providing a given loop of the one or more loops, a user may click on or touch points and edges of the tetrahedral meshing so that they form the loop. Alternatively or additionally, the user may, for providing a given loop, perform a sequence of clicks or touches on the tetrahedral meshing or on the point cloud, each click of touch defining a point. Then, the method may automatically infer a loop of edges and vertices from the sequence of user-picked points, which may include over-sampling the user-picked points and/or finding a loop of edges and vertices fitting the user-picked points. Additionally or alternatively, the user may, for providing a given loop, draw a closed line on the tetrahedral meshing or on the point cloud, the line (e.g. roughly) defining the shape of the boundary. Then, the method may automatically infer a loop of edges and vertices from the user-defined line, which may include sampling the user-defined line and/or finding a loop of edges and vertices fitting the user-defined line.

Alternatively, the providing S30 of the one or more loops may be carried out automatically. For example, the providing of the one or more loops may be based on considerations about the computer memory. For example, the providing S30 of the one or more loops may comprise dividing the 3D point clouds or the tetrahedral meshing into bounded regions/portions so that each region/portion has a number of points of the 3D point cloud that fit into a given computer memory (e.g. 16 Gigabytes for a standard or cheap computer). Then, the one or more loops may each correspond to the boundary of a respective one of the portions. The resulting division of the tetrahedral meshing may be watertight, i.e. the separated portions/regions coincide along their common boundary.

An implementation of the providing S30 of the one or more loops automatically is now discussed. This implementation notably applies to the case where the 3D point cloud has a large number of points, e.g. larger than 10 M points for a standard or cheap computer with a 16 Gigabytes memory. This implementation subdivides the point cloud/tetrahedral meshing into regions where the number of points fits in the computer memory and ensures that the resulting division/resulting meshing is watertight, by ensuring that the separated meshed regions coincide along their common boundary. This implementation proceeds as follows:

- The computing S20 of the tetrahedral meshing comprises computing a 3D Delaunay triangulation of the 3D point cloud with any known out-of-core method that allows to do so. Such method may include any method able to perform the 3D Delaunay triangulation by regions, such as the method disclosed in Lo, S. H. "Parallel Delaunay triangulation in three dimensions." *Computer Methods in Applied Mechanics and Engineering* 237 (2012): 88-106, which is incorporated herein by reference.
- The providing S30 of the one or more loops comprises extracting a silhouette seen from above of the whole 3D Delaunay triangulation, the 3D Delaunay triangulation being a convex 3D body whose silhouette is a single loop.
- The providing S30 further comprises repeating the following, until each loop encloses a number of points that fits into the computer memory:
  - defining a vertical plane;
  - extracting the tetrahedrons of the 3D Delaunay triangulation cutting this plane; and
  - defining a lexicographic minimal path in these extracted tetrahedrons, thereby subdividing the loops into two smaller loops.

The determining S40 of an open triangulated surface in the tetrahedral meshing having the one or more loops as boundary may be carried out by any suitable method or any suitable technique. The determined S40 open triangulated surface is the first open triangulated surface. In examples, the determining S40 may carry out algorithm 2 which will be discussed hereinafter. Any other suitable combinatorial geometric algorithms could be carried out instead of algorithm 2.

The determining S50 of the second open triangulated surface representing a skin of a portion of the structure is now further discussed.

The determining S50 explores candidate open triangulated surfaces. Each candidate is a set of triangles of the tetrahedral meshing forming an open triangulated surface in the tetrahedral meshing. The determining penalizes a high rank of candidates in the lexicographic order and searches candidates violating consistency of the labelling. In other words, the determining operates a selection among candidate open triangulated surfaces and selects among them one candidate being minimal, or at least tending to be minimal, in the lexicographic order as well as violating consistency of the labelling.

The selection among the candidate open triangulated surfaces involves the lexicographic order and the triangle order, which are now discussed.

The lexicographic order orders a first candidate open triangulated surface relative to a second candidate open triangulated surface, i.e. provides an ordering between the first candidate open triangulated surface and the second candidate open triangulated surface. The concept of lexicographic order is known per se. The first candidate open triangulated surface has (e.g. is made of) first triangles, i.e. of the tetrahedral meshing, and the second candidate open triangulated surface has (e.g. is made of) second triangles, i.e. of the tetrahedral meshing. Both first triangles and second triangles are ordered according to a decreasing rank of the triangle order.

Ordering the first candidate open triangulated surface relative to the second candidate open triangulated surface according to the lexicographic order may notably comprise, as the lexicographic order is based on the triangle order, assessing the ordering of the first triangles and the ordering of the second triangles according to the decreasing rank of the triangle order. The ordering may further comprise establishing a rank in the lexicographic order of the first candidate open triangulated surface relative to the second candidate open triangulated surface based on the assessed ordering of both the first triangles and second triangles. In other words, the ordering may comprise establishing a relative ranking, in the lexicographic order, between the first candidate open triangulated surface and the second candidate open triangulated surface, by comparing the ordered first and second triangles.

An example of the ordering the first candidate open triangulated surface relative to the second candidate open triangulated surface according to the lexicographic order is now discussed. Let A be the set made of the first triangles and let B be the set made of the second triangles. Let $C = A \Delta B = (A \cup B) \setminus A \cap B$, i.e. C is the set of triangles belonging to A or to B but which do not belong to both A and B. If C is empty, then A=B. In this case the first candidate open triangulated surface and the second candidate open triangulated surface have the same rank in the lexicographic order. If C is not empty, then let T be the largest triangle of C according to the triangle order, i.e. T is the first triangle of C if the triangles of C are ordered according to the decreasing rank of the triangle order. Put it another way, T is a triangle of C which is the most penalized by the triangle order, e.g. which is the largest among the triangles of C, as discussed hereinbelow. If T belongs to A, then A is larger than B. In this case the first candidate open triangulated surface has a higher rank than the second candidate open triangulated surface in the lexicographic order. Conversely, if T belongs to B, then B is larger than A. In this case the second candidate open triangulated surface has a higher rank than the first candidate open triangulated surface in the lexicographic order. It is to be noted that, if $B \subset A$ (strictly), then A is larger than B.

The ordering may result in that the set of all candidate open triangulated surfaces is ordered according to the lexicographic order, i.e. each candidate open triangulated surface has a respective rank in the lexicographic order. The determining S50 penalizes a high rank of a candidate open triangulated surface. For example, the determining S50 may be such that candidate open triangulated surfaces are discarded because of their high rank and a candidate open triangulated surface are not discarded because of its low rank.

The triangle order penalizes a triangle size. The concept of penalizing a triangle size is now discussed. Let T and T' be two triangles. Penalizing a triangle size may comprise assessing, for each triangle T and T', a respective measure of the size of the triangle and attributing a higher rank in the triangle order to the triangle having the larger measure. The measure of a triangle size may also be referred to as the triangle weight or as the weight of the triangle. The measure of the size may for example comprise a first real-valued function contributing towards measuring the triangle size, a second real-valued function contributing differently towards measuring the triangle size, and/or a couple made of the first function and of the second function. Penalizing triangle size may comprise ordering the two assessed measures of the size relative to one another, e.g. according to any order ordering two real numbers or two couples of real numbers relative to one another, as known per se in the art. In other words, if T is larger (i.e. has a larger size) than T', then the measure of the size of T is larger (e.g. according to the ordering of the measures) than the measure of the size of T'. Now, if the couple (T,T') is to be ordered according to the decreasing rank of the triangle order, just as the previously discussed first triangles and second triangles, then, in this ordering, T comes before T'. Similarly, if $T_1, T_2, \ldots, T_n$ is a list of triangles which is ordered (i.e. $T_1$ is the first, $T_2$ is the second, and so on), and if the ordering is according to the decreasing rank of the triangle order, it means that the measure of the size of $T_1$ is larger than the measure of the size of $T_2$, which is larger than the measure of the size of $T_3$, and so on. In examples, the measure of the size of a triangle T is a couple of real-valued functions made of the radius of the smallest enclosing circle of T and of the inverse of the radius of the circumscribed circle of T. Such examples constitute a robust and efficient manner of measuring and penalizing triangle size.

This amounts to say that, when ordering two candidate open triangulated surfaces as previously discussed, a higher rank in the lexicographic order is attributed to the one of the two which has the triangle that is the most penalized by the triangle order, e.g. that is the largest. As previously mentioned, such triangles may be representative of (e.g. may be part of a meshing of) regions of the 3D point cloud having a low density of points, e.g. comprising outliers. Discarding candidate open triangulated surfaces having such triangles, by penalizing their high rank in the lexicographic order, allows to search for an open triangulated surface representing accurately the skin of the portion of the structure, and reduces the sensibility to density variations and/or to outliers. This makes the method robust and accurate.

In examples, the method may result in that the triangles (e.g. all of them or a substantial part of them) of the determined open triangulated surface are, as far as possible, small triangles (i.e. with a small size), including triangles of which shape is notably not too stretched, e.g. triangles having a relatively small area and for which the ratio between the triangle height and the triangle bottom is close to 1. In fact, although the triangle order, when comparing two triangles, does not necessarily penalize the flattest of the two, basing the lexicographic order on the triangle order may however result in that flat triangles are, as far as possible, avoided. As a matter of fact, the lexicographic order compares chains of triangles (each forming an open triangulated surface), and not triangles of a single pair of triangles, and attempts to reward (i.e. to give a low rank to) the chain made of the smallest possible triangles. Comparing chains of triangles, and not triangles of a single pair of triangles, and penalizing chains having (e.g. a too large amount of) large triangles may in fact result in that the determined open triangulated surface is made of triangles which are (e.g. generally) small and not too flat. Such triangles are representative of a skin. This makes the method robust and accurate.

In examples, the triangle order penalizes, for a respective triangle, a high value of the radius of the smallest enclosing circle, i.e. the smallest enclosing circle of the triangle.

The smallest enclosing circle of the triangle is the circle having the smallest radius among all circles enclosing the points of the triangle. The radius of the smallest enclosing circle of a triangle contributes towards measuring the size of the triangle and penalizing a high value of the radius of the smallest enclosing circle contributes towards penalize the triangle size. In other words, the radius of the smallest enclosing circle is a real-valued function contributing towards measuring triangle size, and which may be part of the measure of the size of the triangle as previously discussed. Furthermore, penalizing a high value of the radius of the smallest enclosing circle is a particularly efficient and robust manner of penalizing triangle size. For example, let T and T' be two triangles, and let $R_B(T)$ and $R_B(T')$ be the radiuses of their respective smallest enclosing circle. Then, in these examples, the inequality $R_B(T) < R_B(T')$ captures the fact that T' has a size larger than the one of T. Penalizing size may in this case consist in attributing a higher rank in the triangle order to T' than to T. Also, ordering T and T' relative to one another according to the decreasing rank of the triangle order means in this case that T' comes before T in this ordering.

In examples, the triangle order further penalizes, for a first triangle and a second triangle having a same smallest enclosing circle, a small value of the radius of the circumscribed circle, i.e. the circumscribed circle of the (first or second) triangle.

The circumscribed circle of a triangle is the circle through the points of the triangle. The radius of the circumscribed circle of a triangle contributes towards measuring the size of the triangle and penalizing a small value of the radius of the circumscribed circle contributes towards penalizing the triangle size, especially in the case of smallest enclosing circle equality as discussed below. In other words the radius of the circumscribed circle is a real-valued function contributing towards measuring the triangle size, and which may be part of the measure of the size of the triangle as previously discussed.

Penalizing a small value of the radius of the circumscribed circle in such a smallest enclosing circle equality case improves robustness of the method. Notably, let T and T' be two triangles, and let $R_B(T)$ and $R_B(T')$ be the radiuses of their respective smallest enclosing circles. Assume that $R_B(T) = R_B(T')$, which may happen for example if both T and T' are obtuse triangles. Put it another way, it may happen that assessing the radius of the respective smallest enclosing circle for both T and T' and penalizing high value of the assessed radiuses may not be sufficient to establish a relative triangle order between T and T' so as to penalize triangle size. In other words, it may not be possible to determine which one of T and T' is the largest so as to penalize one of them based only on the smallest enclosing circle. Further penalizing small value of the radius of the circumscribed circle, however, allows such a determination, and in that respect, improves robustness of the method. Furthermore, penalizing a small value of the radius of the circumscribed circle is a particularly efficient and robust manner of penalizing triangle size. For example, let $R_C(T)$ and $R_C(T')$ be the radiuses of the respective circumscribed circles of T and T'. Then, in these examples, where $R_B(T) = R_B(T')$, the inequality $R_C(T) > R_C(T')$ captures the fact that T' has a larger area than the one of T and is larger than T. In other words, the equality $R_B(T) = R_B(T')$ represents the fact that the radius of the smallest enclosing circle does not suffice to determined which triangle is the largest among T and T'. However, the inequality $R_C(T)>R_C(T')$ represents the fact that T' has a larger area than T, which allows to determine that T' is larger than T despite smallest enclosing circle equality between the two triangles. Penalizing size may in this case consist in attributing a higher rank in the triangle order to T' than to T. Also, ordering T and T' relative to one another according to the decreasing rank of the triangle order means in this case that T' comes before T in this ordering.

As previously discussed, in examples, each triangle T size is measured by a measure of the triangle size which is a couple of real-valued functions made of the radius of the smallest enclosing circle of T and of the inverse of the radius of the circumscribed circle of T. The measure may be given by the formula $$\left(R_B(T), \frac{1}{R_C(T)}\right).$$

The triangle order may in this case be an order on the measures of the triangle sizes, for example an order in which a comparison between the radiuses of smallest enclosing circles predominates, and in which a comparison between the inverses of the radiuses of circumscribed circles only comes into play in case of smallest enclosing circle equality. For example, let T and T' be two triangles. If $R_B(T)<R_B(T')$, then the measure $$\left(R_B(T'), \frac{1}{R_C(T')}\right)$$

of the size of T' is larger than the measure $$\left(R_B(T'), \frac{1}{R_C(T)}\right)$$

of the size of T in the order of the measures, as comparison between radiuses of smallest enclosing circles predominates. In case of smallest enclosing circle equality, that is $R_B(T)=R_B(T')$, then comparison between the inverses of the radiuses of circumscribed circles comes into play, and more specifically: if $$\frac{1}{R_C(T)} < \frac{1}{R_C(T')},$$

then the measure $(R_B(T'),$ $$\frac{1}{R_C(T')})$$

of the size of T' is larger than the measure $R_B(T)$, $$\frac{1}{R_C(T)})$$

of the size of T in the order of the measures. Then, if the measure of the size of T is lower than the measure of the size of T' in the order on the measures, T' has a higher rank than T in the triangle order. However, if T and T' are ordered relative to one another in the decreasing rank of the triangle order, then T comes after T'.

The triangle order is now further discussed with references to FIGS. 2 to 5, illustrating the triangle order.

The triangles ordering illustrated in these figures is noted $\leq_\infty$ and is based on two concepts: the smallest enclosing circle and the circumscribed circle. The smallest enclosing circle is the circle featuring the smallest radius and enclosing the points of the triangle. The circumscribed circle is the circle through the three points of the triangle. Given a triangle T, the radius of its smallest enclosing circle is noted $R_B(T)$ and the radius of its circumscribed circle is noted $R_C(T)$.

FIG. 2 illustrates a triangle T together with its enclosing circle and circumscribed circle. They are such that $R_B(T) \neq R_C(T)$ because the triangle features an obtuse angle. Conversely, FIG. 3 illustrates a triangle T with three acute angles. This makes the enclosing circle and circumscribed circle coincident and so $R_B(T)=R_C(T)$.

The circumscribed circle is undefined when the triangle features three aligned points or coincident points. This degeneracy situation is out of the scope of the present disclosure because the point cloud is generic by nature. Given two triangles T and T', their relative ordering $\leq_\infty$ is defined as follows: $T \leq_\infty T'$ if $R_B(T)<R_B(T')$ or if $R_B(T)=R_B(T')$ and $R_C(T) \geq R_C(T')$. In other words, the enclosing circles radii $R_B(T)$ and $R_B(T')$ are relevant when they are not equal, otherwise the circumscribed circles radii $R_C(T)$ and $R_C(T')$ are relevant. FIG. 4 illustrates two acute triangles ordered through their respective $R_B$ radius. FIG. 5 illustrates two obtuse triangles. They feature the same smallest enclosing circle radius $R_B$ (dotted lines) so they are ordered through $R_C$ radius.

This ordering is in fact a lexicographic ordering defined by a couple of numerical values. Noting $T_i$, i=1, . . . , n the n triangles of the meshing, they are sorted according to the lexicographic order performed on couples $(R_B(T_i),$ $$\frac{1}{R_C(T_i)})$$

for i=1, . . . , n. This ordering is very subtle since it combines, into a simple formula, the shapes of triangles (acute vs. obtuse) as well as the dimensions. It is designed to set a lower rank to "small and flat" triangles, which are more likely to occur on the unknown separating surface to be recognized.

The determined open triangulated surface violating consistency of a labelling of the tetrahedral meshing with two given labels. The determining S50 of the open triangulated surface thus selects, among the candidates, an open surface violating consistency of the labelling. As the determining S50 also penalizes a high rank in the lexicographic order, the determining S50 thereby operates a selection among the candidates and selects, among those violating consistency of the labelling, an open surface minimal, or at least tending to be minimal, for the lexicographic order.

The labelling is now further discussed.

The labelling is a labelling of the tetrahedral meshing with two given labels. In other words, a label is assigned to each tetrahedron of the tetrahedral meshing. The outside region, that is the region not meshed by the tetrahedral meshing may also be assigned a label. The labels may for example be colors, such that each tetrahedron has a given color. Other types of labels may be used.

The determining S50 may comprise assigning the labels. For example, the determining S50 may comprise, before exploring the candidates, assigning the same label to all the tetrahedrons. The exploring and the penalizing may then use the labelling as a variable. That is, when determining S50 a second open triangulated surface being minimal in the lexicographic order among the open triangulated surfaces violating the labelling, the determining S50 may comprise iteratively modifying the labels of the tetrahedrons. The determining S50 may for example iteratively attempt to ensure consistency of the labelling by visiting triangles of the tetrahedral meshing and iteratively changing labels of tetrahedrons for adapting the labelling to ensure consistency. When doing so, the determining S50 may iteratively detect each triangle for which this adaptation cannot be performed and may identify/reward such a triangle as being part of the second open triangulated surface to determine.

Each triangle of the tetrahedron may be associated with a specification specifying whether the triangle belongs to the first open triangulated surface or not. The specification may specify how the triangle respects or violates the labelling. A triangle specified as belonging to the first open triangulated surface is known to respect consistency of the labelling only if it separates two tetrahedrons having different labels. A triangle specified as not belonging to the first open triangulated surface is known to respect consistency of the labelling only if it separates two tetrahedrons having the same label. The determining S50 may comprise assigning to each triangle such a specification. Contrary to the labelling, the specifications of the triangles do not form a variable of the determining S50, i.e. the specifications are not modified by the determining. In other words, they form a constraint thereof.

In examples, the specification may be a permutation. The permutation is either the identity, or a switch (also referred to as "swap"). Each triangle of the first open triangulated surface is assigned with the switch/swap, which indicates that the triangle respects the consistency of the labeling only when it separates two tetrahedrons having different labels (i.e. the triangle switches the labelling). Each triangle of the first open triangulated surface is assigned with the identity, which indicates that the triangle respects the consistency of the labeling only when it separates two tetrahedrons having the same label (i.e. the triangle preserves the labelling).

The determined second open triangulated surface violates consistency of the labelling, which means that each triangle of the open triangulated surface does not respect consistency of the labelling. Requiring that the second open triangulated surface to determine violates consistency of the labelling ensures that the second open triangulated surface has the same boundary as the first open triangulated surface, as further explained hereinbelow. The determining S50 explores candidate open triangulated surfaces with this requirement, so that the determining S50 selects a candidate open triangulated surface satisfying this requirement. There exists such a candidate since the first open triangulated surface already satisfies the requirement as its triangle all switch the labelling. The determining S50 then finds another candidate that satisfies the requirement with the additional requirement that the candidate must minimize the lexicographic order.

Examples of the determining S50 are now discussed.

In these examples, before the exploring and the penalizing, the determining S50 may comprise assigning a label to each tetrahedron of the tetrahedral meshing, e.g. by assigning the same label to each tetrahedron. Still before the exploring and the penalizing, the determining S50 may also comprise assigning a permutation to each triangle of the tetrahedral meshing, e.g. by assigning the switch permutation to each triangle of the first open surface and the identity permutation to the remaining triangles.

The exploring and the penalizing may comprise visiting triangles of the tetrahedral meshing according to a decreasing rank of the triangle order. The exploring and the penalizing may then comprise discarding visited triangles having a high rank of the triangle order as long as consistency of the labelling can be preserved.

The visiting of the triangles implements the exploring of the candidate triangulated surfaces. Each time a triangle is visited, the triangle is either discarded or kept. This amounts to say that exploring a given candidate triangulated surface corresponds to a particular manner of visiting and keeping or discarding triangles of the tetrahedral meshing. The visiting visits the triangle according to a decreasing rank of the triangle order. In other words, the triangle of the tetrahedral meshing having the highest rank in the triangle order, that is the triangle having the largest size among the triangles of the meshing, is visited first. Then the triangle having the second highest rank is visited, and so on, the triangle having the lowest rank being the latest visited. Each time a triangle is visited, the triangle is either kept, i.e. it is selected as belonging to the determined second open triangulated surface, or discarded, i.e. it will not be part of the determined second open triangulated surface.

The penalizing discards the visited triangles having a high rank of the triangle order. This allows to avoid the determined second open triangulated surface to feature large and/or flat triangles, or at least, this allows to avoid the determined second open triangulated surface to feature too many large and/or flat triangles. That being said, the penalizes discards these high-ranked triangles as long as consistency of the labelling can be preserved while discarding the triangles. This allows to discard the high-ranked triangles when it is certain that it is still possible to determine a second open triangulated surface violating consistency of the labelling without using these high-ranked triangles, by using triangles with lower ranks. Thereby, an explored triangle is rewarded, i.e. determined as being part of the determined second open triangulated surface, only when there is no possibility of preserving labelling consistency because of the presence of this triangle. Since the triangles are explored in the decreasing rank of the triangle order, this allows to avoid, as far as possible, large and/or flat triangles to belong to the determined second open triangulated surface: these triangles are explored in first/early, so that when they are explored, if they violate labelling consistency, there are still possibilities of preserving labelling consistency without necessarily rewarding these triangles.

The discarding may comprise, for each visited triangle, assessing whether the triangle violates or respects consistency of the labelling. Then, the discarding may comprise, for each visited triangle, if the triangle violates consistency of the labelling, either rewarding the triangle, either adapting the labelling to respect consistency. Rewarding the triangle means adding the triangle to the determined second open triangulated surface, i.e. the triangle will ultimately, at the end of the exploring and penalizing, belong to the determined second open triangulated surface. This manner of performing the discarding allows to avoid systematically rewarding triangles violating consistency of the labelling: sometimes, if an explored triangle violates consistency of the labelling, the labelling can be adapted to respect consistency, so that the triangle need not be rewarded. This may notably be the case for the large and/or flat triangles, explored in first/early. When labelling consistency cannot be reestablished adapting the labelling, the explored triangle violating the consistency is necessarily rewarded. This may notably be the case for the less large and/or flat triangles, explored in last/late.

The discarding may comprise, for each visited triangle, for example after the assessing of whether the triangle violates or respects consistency of the labelling:
  if the triangle separates two tetrahedrons that are in a same connected component and if the triangle violates consistency of the labelling, rewarding the triangle;
  if the triangle separates two tetrahedrons that are in different connected components:
    if the triangle violates consistency of the labelling, switching the label of one of the connected components (i.e. of all the tetrahedrons of the connected component) and merging the connected components (i.e. the two connected components thereby forming a single connected component),
    if the triangle respects consistency of the labelling, merging the connected components (i.e. the two connected components thereby forming a single connected component).

A connected component is a set of tetrahedrons such that, for each couple of tetrahedrons in the set, there exists a path of adjacent tetrahedrons in the set, i.e. tetrahedrons two-by-two sharing a triangle, and of the triangles shared by them, such that the path connects the tetrahedrons of the couple, and each triangle in the path respects consistency of the labelling. With this manner of performing the discarding, the method only rewards triangles violating the labelling consistency when these triangles separate tetrahedrons of a same connected component. This allows to reward triangles violating the labelling consistency only when labelling consistency cannot be reestablished by switching the labelling of the connected components separated by the triangle. This further permits to reward low-ranked triangles, since they are explored in last/late, such that when they are explored and violate the labelling consistency, there is no possibility of reestablishing consistency by performing a switch.

Any suitable implementation of the previously discussed manners of performing the exploring and penalizing can be used. For example, the dual graph of the tetrahedral meshing can be used. The concept of dual graph of a tetrahedral meshing is known per se. The dual graph is a graph having nodes and arcs connecting nodes, where each node represents a tetrahedron in the tetrahedral meshing, and where each arc connects two nodes if the tetrahedrons represented by the two nodes share a triangle, the share triangle being then represented by the arc. An additional node is added for representing the outside region, each triangle facing the outside region thereby being representing by an edge in the dual graph. The triangles may notably be visited by associating to each arc of the dual graph the weight of its corresponding triangle in the triangle order and by visiting the arcs of the dual graph in the decreasing order of their weights, starting with the arcs connecting triangles to the outside region.

An implementation of the method is now discussed.

This implementation allows to determine an open triangulated surface forming a skin of a portion of a structure of a real scene represented, at least partially, by a 3D point cloud, given one or more loops given as boundary of the portion. The 3D point cloud may include a very large number of points, may be incomplete (e.g. with one or more holes), and/or may be error prone. Yet this implementation still succeeds. The 3D point cloud may feature density variations, e.g. that can be very important. Yet this implementation still succeeds. It may also feature outliers, which are low density sets of wrong points randomly spread in space. Yet this implementation still succeeds. In addition, the smoothness of the structure's real shape and/or of the real scene may be unknown. Yet this implementation still succeeds.

In other words, this implementation computes the second open triangulated surface from such a point cloud regardless of the density variations, in a reasonable computing time. This implementation is thus robust and does not involve tuning parameters.

Figure 6:
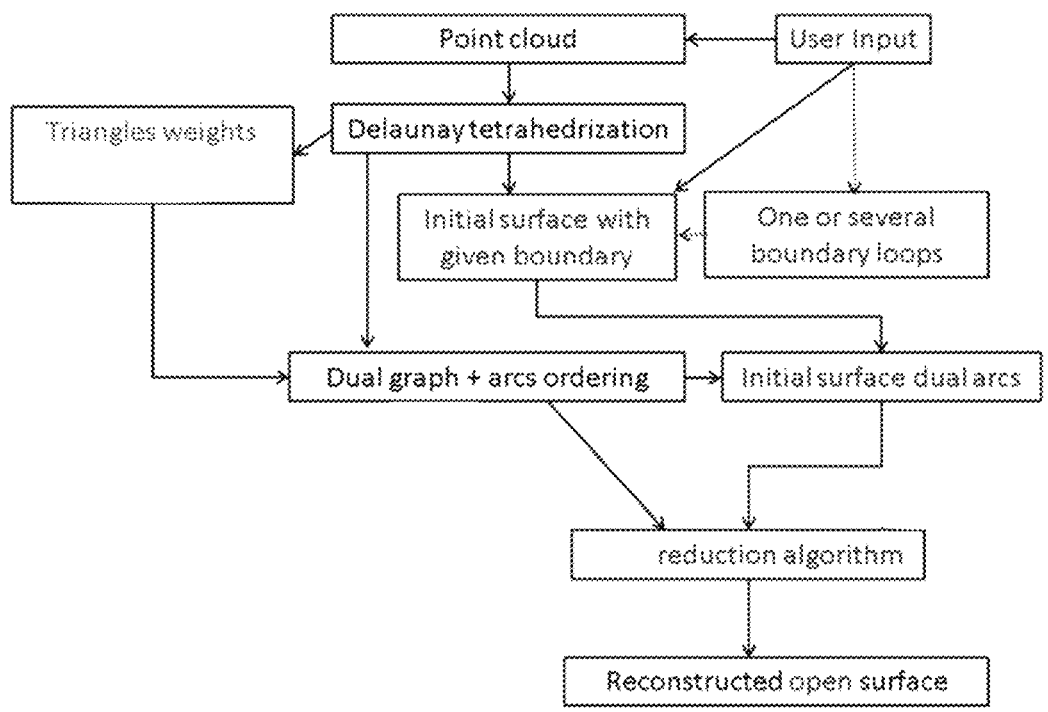

FIG. 6 shows a flowchart of this implementation of the method. As illustrated in FIG. 6, this implementation comprises the providing S10 of a 3D point cloud. The 3D point cloud is provided by a user. This implementation further comprises computing S20 a 3D Delaunay tetrahedral meshing of the 3D point cloud. Since the point cloud includes three-dimensional points, the resulting Delaunay meshing is made of adjacent tetrahedrons, each tetrahedron being bounded by four triangles. This implementation further comprise defining the lexicographic order, including providing, e.g. computing, triangles weights of the triangles of the Delaunay tetrahedral meshing, and providing a dual graph of the tetrahedral meshing. The concept of dual graph of a Delaunay triangulation is known per se and has been discussed above. This graph captures tetrahedrons adjacency through triangles sharing. This implementation further comprises ordering the arcs of the dual graph, each representing a triangle of the Delaunay meshing, with the triangles weights. Thereby, each node of the dual graph represents a tetrahedron of the mesh, each arc of the dual graph represents a triangle of the mesh, and each arc of the dual graph is labeled with the corresponding triangle's rank in the lexicographic order. This implementation notably explores the arcs of the dual graph in the decreasing order when performing the determining S50, as discussed hereinafter.

Still referring to the flowchart of FIG. 6, this implementation further comprises providing the first open triangulated surface with a given boundary. The first open surface may be directly provided by a user. Alternatively, the providing of the first open surface may comprise providing S30 one or more loops which define the given boundary. The providing S30 of the one or more loops may be carried out by a user or automatically, as previously discussed. The implementation may then comprise determining S40, given the one or more loops, a first open surface made of a set of triangles in the Delaunay tetrahedral mesh and whose boundary matches the given boundary.

Still referring to the flowchart of FIG. 6, given the ordered dual arcs of the Delaunay triangulation, and given the first open triangulated surface, the implementation comprises identifying the dual arcs of the first open triangulated surface, representing triangles of the first open triangulated surface. This implementation comprises then, based on the dual graph and its ordered arcs and based on the identified first open triangulated surface dual arcs, a reduction algorithm which implements the determining S50 of a second open triangulated surface representing a skin of a portion of the structure, thereby yielding a reconstructed open surface representing the skin. The first open triangulated surface is only constrained by its boundary and, in general, fails to go through the densest point area. But when given as input to the reduction algorithm, the algorithm determines S50 an optimal surface (i.e. with respect to minimizing the lexicographic order, thereby going through the densest point area) with the same boundary/boundaries. The reduction algorithm discards arcs of the dual graph in such a way that the remaining dual arcs define a triangulated open surface that is the reconstructed second open triangulated surface representing the skin.

This implementation notably applies to 3D reconstruction applications where there is a need to produce open surfaces, that is surfaces with boundaries. In this case, given a point cloud, this implementation provides, upon user action or automatically, a boundary, made of one or several polygonal loops (i.e. closed polylines) with vertices in the point cloud. This implementation allows to produce then an open mesh whose vertices belong to the point cloud and whose boundary coincides with the given loops. This implementation notably allows to mesh open surfaces representing terrains from LIDAR data and, since this implementation is capable of control the boundaries, it allows to enforce common boundaries among adjacent terrain area. Applications of this implementation will be discussed in further details hereinafter.

An outline of the implementation is now briefly discussed, before going in further details about algorithms involved in the implementation.

Figures 7, 8, 9:
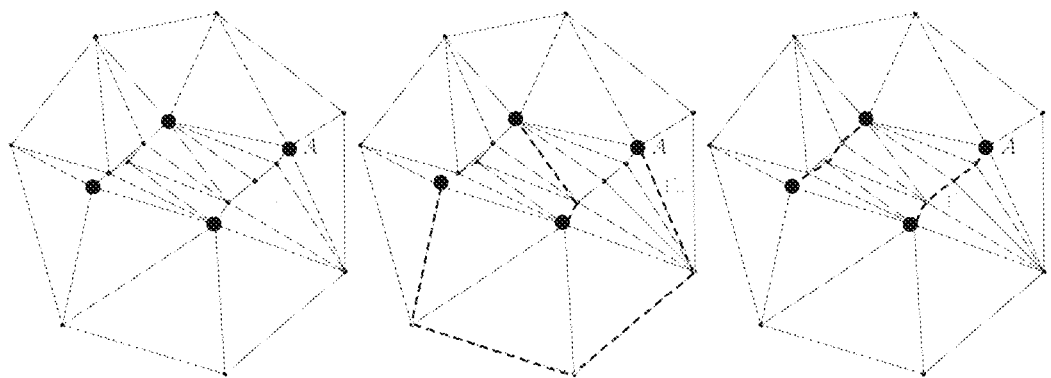

The implementation manipulates cycles. A 1-cycle in a 3-dimensional Delaunay complex is a union of loops, or in other words a set of edges such that each vertex belongs to an even number of edges. A 0-cycle in a 2-dimensional Delaunay complex is just an even number of vertices. FIGS. 7 to 9 illustrate with one dimension less, that is in a dimension 2 Delaunay complex, the implementation of the method, that finds a lexicographic minimal chain for a given boundary. In this 2D illustration, the total order on edges consists in comparing their length. FIG. 7 shows a loop A provided at S30, the loop A consisting in four vertices, illustrated by large bullet points on FIG. 7. FIG. 8 illustrates the determining S40 of an open surface having loop A as boundary, the determining S40 consisting in computing a chain $\Gamma_0$ bounding the provided set A, i.e. having A has boundary, i.e. in algebraic notation $\partial \Gamma_0 = A$. The chain $\Gamma_0$ is illustrated by the dotted lines on FIG. 8. An algorithm for implementing this determining step S40 will be further discussed hereinafter, although alternative suitable algorithm, for example alternative suitable combinatorial geometric algorithms, can also be used, as previously explained. FIG. 9 illustrates the determining S50, which consists in, given the resulting chain $\Gamma_0$ of the first step, computing the lexicographic minimal chain $\Gamma$ with same boundary as (in fact homologous to) $\Gamma_0$, i.e., in algebraic notation, $\partial \Gamma = \partial \Gamma_0 = A$. The chain $\Gamma$ is illustrated by the dotted polylines lines on FIG. 9. An algorithm implementing this determining step S50 will be further discussed hereinafter.

Concepts involved in the present implementation are now discussed.

Simplicial Complexes

Consider an independent family $A=(a_0, \ldots, a_d)$ of points of $\mathbb{R}^N$. A d-simplex $\sigma$ spanned by A is the set of all points, where $\Sigma_{i=0}^d t_i a_i, \forall t_i \in [0,d], t_i \geq 0$, and $\Sigma_{i=0}^d t_i = 1$. Any simplex spanned by a subset of A is called a face of $\sigma$. A simplicial complex K is a collection of simplices such that every face of a simplex of K is in K and the intersection of two simplices of K is either empty either a common face. The dimension of a simplicial complex is the maximal dimension of its simplices. Simplicial complexes generalize graphs since graphs could be defined as 1-dimensional simplicial complexes. A d-dimensional simplicial complex is said pure if it is of dimension d and any simplex has at least one coface of dimension d.

Simplicial Chains

Let K be a simplicial complex of dimension at least d. The notion of chains can be defined with coefficients in any ring but in the present disclosure the definition is restricted to coefficients in the field $\mathbb{Z}_2 = \mathbb{Z}/2\mathbb{Z}$. A d-chain A with coefficients in $\mathbb{Z}_2$ is a formal sum of d-simplices:

$$A = \sum_i x_i \sigma_i, \text{ with } x_i \in \mathbb{Z}_2 \text{ and } \sigma_i \in K \qquad (1)$$

Let $C_d(K)$ be the vector space over the field $\mathbb{Z}_2$ of d-chains in the complex K. Interpreting the coefficient $x_i \in \mathbb{Z}_2 = \{0,1\}$ in front of simplex $\sigma_i$ as indicating the existence of $\sigma_i$ in the chain A, the d-chain A can be viewed as a set of simplices: for a d-simplex $\sigma$ and a d-chain A, one can write that $\sigma \in A$ if the coefficient for $\sigma$ in A is 1. With this convention, the sum of two chains corresponds to the symmetric difference on their sets. In what follows, a d-simplex $\sigma$ can also be interpreted as the d-chain containing only the d-simplex $\sigma$.

Boundary Operator

For a d-simplex $\sigma=[a_0, \ldots, a_d]$, the boundary operator is defined as the operator:

$$\partial_d : C_d(K) : \to C_{d-1}(K)$$

$$\partial_d \sigma =_{def} \sum_{i=0}^{d} [a_0, \ldots, \hat{a}_i, \ldots, a_d]$$

where the symbol $\hat{a}_i$ means the vertex $a_i$ is deleted from the array. A chain with zero boundary is called a cycle. The kernel of the boundary operator $Z_d = \text{Ker } \partial_d$ is called the group of d-cycles and the image of the operator $B_d = \text{Im } \partial_{d+1}$ is the group of d-boundaries. Two d-chains A and A' are homologous A−A'=$\partial_{d+1}(B)$, for some (d+1)-chain B.

Lexicographic Order

Given a total order on the d-simplices of K, $\sigma_1 < \ldots < \sigma_n$, where n=dim$C_d$(K). From this order, a lexicographic total order on d-chains can be defined as follows.

$$C_1 \subseteq_{lex} C_2 \underset{def}{\Leftrightarrow} \begin{cases} C_1 + C_2 = 0 \\ \text{or} \\ \sigma_{max} = \max\{\sigma \in C_1 + C_2\} \in C_2 \end{cases}$$

This total order naturally extends to a strict total order $\sqsubset_{lex}$ on $C_d(K)$. In the context of the present disclosure, the lexicographic order on the triangulated surfaces of the tetrahedral meshing is induced by the triangle order on the triangles of the tetrahedral meshing, which is a total order on the triangles of the tetrahedral meshing.

Problem: Lexicographic Optimal Chain for a Given Boundary (LOCGB)

This implementation contemplates the following problems.

Problem 1: Given a simplicial complex K with a total order on the d-simplices and a d-chain $\Gamma_0 \in C_d(K)$, find:

$$\Gamma_{min} = \min_{\subseteq_{lex}} \{\Gamma \in C_d(K) | \partial_d \Gamma = \partial_d \Gamma_0\}.$$

Problem 2: Given a simplicial complex K with a total order on the d-simplices and a (d−1)-cycle A, check if A is a boundary:

$$B_A =_{def} \{\Gamma \in C_d(K) | \partial_d \Gamma = A\} \neq \emptyset.$$

If it is the case, find the minimal d-chain Γ bounded by A:

$$\Gamma_{min} = \min_{\subseteq_{lex}} B_A.$$

In Problem 2, finding a representative $\Gamma_0$ in the set $B_A \neq \emptyset$ such that $\partial_d \Gamma_0 = A$ is sufficient: it remains then to solve Problem 1 to find the minimal d-chain $\Gamma_{min}$ such that $\partial_d \Gamma_{min} = \partial_d \Gamma_0 = A$. As further discussed hereinafter, this implementation computes, the open triangulated surface representing the skin by solving Problem 2 in two steps: given the one or more loops A the determining S40 finds a representative $\Gamma_0$ in the set $B_A \neq \emptyset$ such that $\partial_d \Gamma_0 = A$. Then the determining S50 solves Problem 1 to determine as the open triangulated surface the minimal d-chain $\Gamma_{min}$ such that $\partial_d \Gamma_{min} = \partial_d \Gamma_0 = A$.

d-pseudomanifold

A d-pseudomanifold is a pure d-dimensional simplicial complex for which each (d−1)-face has exactly two d-dimensional cofaces.

Dual Graph

The dual graph of a d-pseudomanifold M is the graph whose vertices are in one-to-one correspondence with the d-simplices of M and whose edges are in one-to-one correspondence with (d−1)-simplices of M: an edge e connects two vertices $v_1$ and $v_2$ of the graph if and only if e corresponds to the (d−1)-face with cofaces corresponding to $v_1$ and $v_2$.

Strongly Connected d-pseudomanifold

A strongly connected d-pseudomanifold is a d-pseudomanifold whose dual graph is connected.

Coboundary Operator

Seeing a graph G as a 1-dimensional simplicial complex, let the coboundary operator $\partial^0: C_0(G) \to C_1(G)$ be the linear operator defined by the transpose of the matrix of the boundary operator $\partial_1: C_1(G) \to C_0(G)$ in the canonical basis of simplices. To avoid introducing non-essential formal definitions, the coboundary operator is defined over chains since, for finite simplicial complexes, the canonical inner product defines a natural bijection between chains and cochains.

Remark 1

For a given graph G=($\mathcal{V}$,ε), let $\mathcal{V}$ and ε respectively denote its vertex and edge sets. Let $\mathcal{M}$ be a given (d+1)-pseudomanifold. For a d-chain $\alpha \in C_d(\mathcal{M})$ and a (d+1)-chain $\beta \in C_{d+1}(\mathcal{M})$, let $\tilde{\alpha}$ and $\tilde{\beta}$ denote their respective dual 1-chain and dual 0-chain in the dual graph $G(\mathcal{M})$ of $\mathcal{M}$. The following holds:

For a set of vertices $\mathcal{V}_0 \subset \mathcal{V}$, $\partial^0 \mathcal{V}_0$ is exactly the set of edges in G=($\mathcal{M}$,ε) that connect vertices in $V_0$ with vertices in $\mathcal{M} \dagger \mathcal{M}_0$.

If $\alpha \in C_d(M)$ and $\beta \in C_{d+1}(M)$, then $\tilde{\alpha} = \partial^0 \tilde{\beta} \Leftrightarrow \alpha = \partial_{d+1} \beta$.

It is now discussed an algorithm for solving Problem 1, thereby implementing the determining S50 as previously explained. In this discussion, let $\mathcal{M}$ be a simplicial complex which is assumed to be a strongly connected (d+1)-pseudomanifold whose d-homology is trivial. In the presently-discussed implementation, $\mathcal{M}$ is a particular a triangulation of $\mathbb{S}^3$ obtained by completion of a 3D Delaunay complex, i.e. the tetrahedral meshing. First of all, a reformulation of problem 1 is given.

Reformulation of Problem 1

As in the general case, the implementation finds a solution to problem 2 by first determining a d-chain $\Gamma_0$ such that $\partial_d \Gamma_0 = A$, which corresponds to step S40, and then solves problem 1, which corresponds to step S50. It is assumed that $\mathcal{M}$ had a trivial d-homology, which can be expressed by saying that all the d-cycles are boundaries:

$$\forall \alpha \in C_d(\mathcal{M}), \partial \alpha = 0 \Leftrightarrow \exists \beta \in C_{d+1}(\mathcal{M}), \partial \beta = \alpha.$$

Therefore, Problem 1 can be reduced to the following problem.

Problem 1.1: Given a strongly connected (d+1)-pseudomanifold $\mathcal{M}$ with a total order on the d-simplices and a d-chain $\Gamma_0 \in C_d(\mathcal{M})$, find:

$$\Gamma_{min} = \min_{\subseteq_{lex}} \{\Gamma \in C_d(\mathcal{M}) | \exists B \in C_{d+1}(\mathcal{M}), \Gamma + \Gamma_0 = \partial B\}.$$

In fact, because of remark 1 made above, if G=($\mathcal{V}$,ε) is the dual graph to the pseudomanifold $\mathcal{M}$, Problem 1.1 can be reformulated as follows.

Problem 1.2: Given a connected graph G=($\mathcal{V}$,ε) with a total order on ε and a set of edges $\tilde{\Gamma}_0 \subset ε$, find the set $\tilde{\Gamma} \subset ε$ minimal for the lexicographic order $\subseteq_{lex}$, such that $\tilde{\Gamma} + \tilde{\Gamma}_0$ is the set of edges that connects vertices in a possibly empty set $\tilde{B} \subset \mathcal{V}$ its complement $\mathcal{V} \setminus \tilde{B}$.

Where the sum $\tilde{\Gamma} + \tilde{\Gamma}_0 = (\tilde{\Gamma} \cup \tilde{\Gamma}_0) \setminus (\tilde{\Gamma} \cap \tilde{\Gamma}_0)$ is meant as the sum of the corresponding 1-chains over $\mathbb{Z}_2$.

Labelling

The labelling is in the present implementation a coloring, although other similar labelling could be used instead. The labelling has two given labels, which are two elements alphabet {b,r} standing for "blue" and "red" and its set of permutations σ{b,r}={ident, swap} defined ident(b)=b, ident(r)=r, swap (b)=r and swap(r)=b.

Augmented Graph

An augmented graph being a triple ($\mathcal{V}$,ε,π) where ($\mathcal{V}$,ε) is a (possibly disconnected) graph, and π:ε→σ{b,r} associates to each edge of the graph a permutation in σ{b,r}. Given a subset of edges ε'⊂ε, the augmented graph obtained by keeping only edges in ε', is denoted ($\mathcal{V}$,ε',π) in which the permutation assignment is the restriction of π to ε'.

Label Assignment

A label assignment is a map $\mathcal{L}:\mathcal{V} \to$ {b,r} that associates a label (i.e. a color) to each node of the graph.

Satisfying Assignment

An augmented graph ($\mathcal{L}$,ε,π) is said to admit a satisfying assignment if there is an assignment $\mathcal{L}$ consistent with π which means that, for each edge $[v_1, v_2] \in ε$, one has:

$$\mathcal{L}(v_2) = \pi([v_1, v_2])(\mathcal{L}(v_1)).$$

The graph may then be also said to respect consistency of the labelling.

Remark 2

Observes that if $\mathcal{L}$ is a satisfying assignment and $C_c \subset \mathcal{V}$ is a connected component in ($\mathcal{V}$,ε), then the assignment $\mathcal{L}'$ that coincides with $\mathcal{L}$ on $\mathcal{V} \setminus C_c$ and with swap $\circ \mathcal{L}$ on $C_c$ is also a satisfying assignment.

Valid Cut

Given an augmented graph ($\mathcal{V}$,ε,π), a set of edges Γ∈ε, is called a valid cut of ($\mathcal{V}$,ε,π) if ($\mathcal{V}$,ε\Γ,π) admits a satisfying assignment. Since ε is a trivial valid cut, the set of valid cuts is not empty.

Another problem can be formulated to solve problem 1.2.

Problem 1.3: Given an augmented graph $(\mathcal{V},\varepsilon,\pi)$ and a total order on ε, find the lexicographic minimal valid cut $\Gamma_{min}$ of $(\mathcal{V},\varepsilon,\pi)$:

$$\Gamma_{min} = \min_{\subseteq_{lex}}\{\Gamma \subset \mathcal{E}, \Gamma \text{ is a valid cut of } (V, \mathcal{E}, \pi)\}.$$

The following lemma holds:

Lemma 1: The solution of Problem 1.2 is the solution of Problem 1.3 for the augmented graph $(\mathcal{V},\varepsilon,\pi_{\Gamma_0})$:

$$\pi_{\Gamma_0}(e) = \begin{cases} ident & \text{if } e \in \mathcal{E}\backslash\Gamma_0 \\ swap & \text{if } e \in \Gamma_0 \end{cases}.$$

Proof of Lemma 1:

First, if $\Gamma+\Gamma_0$ is the set of edges that connect vertices in a possibly empty set $B \subset \mathcal{V}$ with vertices in its complement $\mathcal{V}\backslash B$, then $(\mathcal{V},\varepsilon\backslash\Gamma,\pi_{\Gamma_0})$ admits a satisfying assignment which means that Γ is a valid cut of $(\mathcal{V},\varepsilon\backslash\Gamma,\pi_{\Gamma_0})$.

Indeed, consider the following assignment:

$$\mathcal{L}(v) = \begin{cases} b & \text{if } v \in B \\ r & \text{if } v \in \mathcal{V}\backslash B \end{cases}$$

Consider an edge $e \in \varepsilon\backslash\Gamma$. Observe that in this case $e \in \Gamma_0 + \Gamma = (\Gamma_0 \cup \Gamma)\backslash(\Gamma_0 \cap \Gamma)$ if and only if $e \in \Gamma_0$. If the vertices of e are both in B or both in $\mathcal{V}\backslash B$, then both vertices have same label by $\mathcal{L}$ and since in this case $e \notin \Gamma_0$, $\pi_{\Gamma_0}(e)=ident$ which is consistent with the labelling of the vertex of e. If now e connects a vertex in B with a vertex $\mathcal{V}\backslash B$, then their label differ and since in this case $e \in \Gamma_0$, one has $\pi_{\Gamma_0}(e)=swap$ which is again consistent. It follows that $\mathcal{L}$ is a satisfying assignment for $(\mathcal{V},\varepsilon\backslash\Gamma,\pi_{\Gamma_0})$.

Second, if Γ is a lexicographic minimal valid cut of $(V,E,\pi_{\Gamma_0})$, then $\Gamma+\Gamma_0$ is the set of edges that connect vertices in a possibly empty set $B \subset \mathcal{V}$ with vertices in its complement $\mathcal{V}\backslash B$.

Indeed, let $\mathcal{L}$ be a satisfying assignment for $(\mathcal{V},\varepsilon\backslash\Gamma,\pi_{\Gamma_0})$. By definition of satisfying assignments, if $e \notin \Gamma$, e is consistent with the labeling of its vertices. Observes first that if $e \in \Gamma$ then, since Γ is minimal among valid cuts, $\pi_{\Gamma_0}$ is not consistent with the labeling of its vertices as, if it were, $\Gamma\backslash\{e\}$ would be again a valid cut, contradicting the minimality of Γ.

Consider the set $B=\{v, L(v)=b\}$. One can consider systematically the four possible cases.

If $e \notin \Gamma_0 \cup \Gamma$ then e is consistent with the labeling of its vertices and since $\pi_{\Gamma_0}(e)=ident$ this means that its vertices are either both in B, either both in $\mathcal{V}\backslash B$.

If $e \in \Gamma_0\backslash(\Gamma_0 \cap \Gamma)$ then e is consistent with the labeling of its vertices and since $\pi_{\Gamma_0}(e)=swap$ this means that one of its vertices in B and the other in $\mathcal{V}\backslash B$.

If $e \in \Gamma\backslash(\Gamma_0 \cap \Gamma)$ then e is not consistent with the labeling of its vertices and since $\pi_{\Gamma_0}(e)=ident$ this means that one of its vertices in B and the other in $\mathcal{V}\backslash B$.

If $e \in \Gamma_0 \cap \Gamma$ then e is not consistent with the labeling of its vertices and since $\pi_{\Gamma_0}(e)=swap$ this means that its vertices are either both in B, either both in $\mathcal{V}\backslash B$.

To sum up e connects a vertex in B with a vertex in $\varepsilon\backslash B$ if and only if $e \in \Gamma+\Gamma_0$.

Let $\Gamma_{min}$ and $\Gamma'_{min}$ min be the respective solutions of Problem 1.2 and Problem 1.3. It has been proved above that $(\mathcal{V}, \varepsilon\backslash\Gamma_{min}, \pi_{\Gamma_0})$ admits a satisfying assignment and by definition of Problem 1.3, $\Gamma'_{min}\sqsubseteq_{lex}\Gamma_{min}$.

It has also been proved above that there is a set of vertex $B \subset \mathcal{V}$ such that $\Gamma'_{min}+\Gamma_{min}$ is precisely the set of edges that connect a vertex in B with a vertex in $\mathcal{V}$ †B. By definition of Problem 1.2, $\Gamma_{min}\sqsubseteq_{lex}\Gamma'_{min}$ and therefore $\Gamma_{min}=\Gamma'_{min}$.

This proves the lemma.

Remark 3

If the augmented graph $(\mathcal{V},\varepsilon, \pi)$ admits a satisfying assignment and if $e_1, \ldots, e_n$ is a closed path in $(\mathcal{V},\varepsilon)$ then:

$$\prod_{i=1,n} \pi(e_i) = ident$$

where the product is meant as functions composition.

Lemma 2: Let $(\mathcal{V},\varepsilon, \pi)$ be an augmented graph with a total order < on ε. Let $\Gamma_{min} \subset \varepsilon' \subset \varepsilon$ be such that $\Gamma_{min}$ is a lexicographic minimum valid cut of $(\mathcal{V},\varepsilon', \pi)$. Let $e^*=(v_1, v_2) \in E$ be such that $e^* < \min\{e \in \varepsilon'\}$.

Then the lexicographic minimal valid cut of $(\mathcal{V},\varepsilon' \cup \{e^*\}, \pi)$ is either $\Gamma_{min}$ or $\Gamma_{min} \cup \{e^*\}$.

Moreover, if $\mathcal{L}$ is a satisfying assignment for $(\mathcal{V},\varepsilon'\backslash\Gamma_{min}, \pi)$ then $\Gamma_{min}$ is the lexicographic minimal valid cut of $(\mathcal{V},\varepsilon' \cup \{e^*\},\pi)$ if and only if one of the two following case occurs:

a) $v_1$ and $v_2$ are in the same connected component in $(\mathcal{V},\varepsilon'\backslash\Gamma_{min})$ and $\pi(e^*)$ is consistent with $\mathcal{L}:\mathcal{L}(v_2)=\pi(e^*)(\mathcal{L}(v_1))$, b) $v_1$ and $v_2$ are not in the same connected component in $(\mathcal{V},\varepsilon'\backslash\Gamma_{min})$.

In case a) $\mathcal{L}$ is again a satisfying assignment $(\mathcal{V},(\varepsilon' \cup \{e^*\})\backslash\Gamma_{min},\pi)$.

In case b), if $\pi(e^*)=ident$ then $\mathcal{L}$ is again a satisfying assignment for $(\mathcal{V},(\varepsilon' \cup \{e^*\})\backslash\Gamma_{min},\pi)$.

If now $\pi(e^*)=swap$ let $C_c(v_1)$ be the connected component of $v_1$ in $(\mathcal{V},\varepsilon')$. $\mathcal{L}'$ defined by:

$$\mathcal{L}'(v) = \begin{cases} \mathcal{L}(v) & \text{if } v \in \mathcal{V}\backslash C_c(v_1) \\ swap \circ \mathcal{L}(v) & \text{if } v \in C_c(v_1) \end{cases}$$

is a satisfying assignment for $(\mathcal{V},(\varepsilon' \cup \{e^*\})\backslash\Gamma_{min},\pi)$.

Proof of Lemma 2:

Let's $\Gamma_{min}$ be the lexicographic minimum valid cut of $(\mathcal{V},\varepsilon',\pi)$ and $\Gamma^*_{min}$ the lexicographic minimum valid cut of $(\mathcal{V},\varepsilon' \cup \{e^*\},\pi)$ Since $(\mathcal{V},(\varepsilon' \cup \{e^*\})\backslash\Gamma_{min},\pi)$ admits a satisfying assignment and $\varepsilon'\backslash(\varepsilon' \cap \Gamma_{min}) \subset (\varepsilon' \cup \{e^*\})\backslash\Gamma^*_{min}$ the same assignment satisfies $(\mathcal{V}, \varepsilon'\backslash(\varepsilon' \cap \Gamma_{min}), \pi)$. $\varepsilon' \cap \Gamma_{min}$ is then a valid cut for $(\mathcal{V}, \varepsilon', \pi)$, so that $\Gamma_{min} \sqsubseteq_{lex} \varepsilon' \cap \Gamma^*_{min} \sqsubseteq_{lex} \Gamma^*_{min}$.

Since $\Gamma^*_{min} \cup \{e^*\}$ is a valid cut for $(\mathcal{V},\varepsilon' \cup \{e^*\},\pi)$, then $\Gamma^*_{min} \sqsubseteq_{lex} \Gamma^*_{min} \cup \{e^*\}$ and therefore:

$$\Gamma_{min} \sqsubseteq_{lex} \Gamma^*_{min} \sqsubseteq_{lex} \Gamma^*_{min} \cup \{e^*\}.$$

As $e^* < \min\{e \in \varepsilon'\}$, there is no set in $\varepsilon' \cup \{e^*\}$ strictly between $\Gamma_{min}$ and $\Gamma^*_{min} \cup \{e^*\}$ for the lexicographic order. It follows that $\Gamma^*_{min}$ is either equal to $\Gamma_{min}$ or $\Gamma^*_{min} \cup \{e^*\}$ and the first assertion of the lemma is proved.

If $v_1$ and $v_2$ are in the same connected component in $(\mathcal{V},\varepsilon')$ then if $\pi(e^*)$ is not consistent with $\mathcal{L}: \mathcal{L}(v_1) \neq \pi(e^*)(\mathcal{L}(v_2))$, then consider the closed path concatenation of e with a path $e_1, \ldots, e_n$ in $(\mathcal{L}, \varepsilon' \backslash \Gamma_{min})$ connecting $v_1$ and $v_2$. Since $\mathcal{L}(v_2) = \Pi_{i=1,n} \pi(e_i)(\mathcal{L}(v_1))$, $\mathcal{L}(v_1) \neq \pi(e^*) \Pi_{i=1,n} \pi(e_i) (\mathcal{L}(v_1))$ so that $\pi(e^*) \Pi_{i=1,n} \pi(e_i)(\mathcal{L}(v_1)) =$ swap. Since $e^*$, $e_1, \ldots, e_n$ is a closed path, Remark 3 implies that $(\mathcal{V}, \varepsilon' \backslash \Gamma_{min}, \pi)$ does not admit any satisfying assignment.

This shows that if $v_1$ and $v_2$ are in the same connected component in $(\mathcal{V}, \varepsilon' \backslash \Gamma_{min})$, then if $\pi(e^*)$ is not consistent with $\mathcal{V}$ then $\Gamma_{min}$ is not in a valid cut for $(\mathcal{V}, (\varepsilon \cup \{e^*\}) \backslash \Gamma_{min}, \pi)$.

Now if $v_1$ and $v_2$ are in the same connected component in $(\mathcal{V}, \varepsilon' \backslash \Gamma_{min})$ and $\pi(e^*)$ is consistent with $\mathcal{V}$, $\mathcal{V}$ is again a satisfying assignment for $(\mathcal{V}, (\varepsilon' \cup \{e^*\}) \backslash \Gamma_{min}, \Gamma)$ and $\Gamma_{min}$ is then a valid cut for $(\mathcal{V}, \varepsilon' \cup \{e^*\}, \pi)$. Since $\Gamma^*_{min}$ is either equal to $\Gamma_{min}$ or $\Gamma_{min} \cup \{e^*\}$, then in this case $\Gamma^*_{min} = \Gamma_{min}$.

It remains to consider the case b) for which $v_1$ and $v_2$ are not in the same connected component in $(\mathcal{V}, \varepsilon' \backslash \Gamma_{min})$. In this case, if $\pi(e^*)$ is consistent with $\mathcal{L}$, $\mathcal{L}$ is also a satisfying assignment for $(\mathcal{V}, (\varepsilon' \cup \{e^*\}) \backslash \Gamma_{min}, \pi)$.

If now $\pi(e^*)$ is not consistent with $\mathcal{L}$, we know from Remark 2 that $\mathcal{L}'$ as defined in the lemma is again a satisfying assignment for $(\mathcal{V}, \varepsilon' \backslash \Gamma_{min}, \pi)$. Since $v_1$ is not in the connected component of $v_2$ in $(\mathcal{V}, \varepsilon' \backslash \Gamma_{min})$, $\pi(e^*)$ is consistent with $\mathcal{L}'$ and the conclusion is the same as in the previous case.

This proves lemma 2.

The reduction algorithm implementing the determining S50 is now discussed. The algorithm is presented in the general context of problems 1, 2 and 1.1 to 1.3 discussed above. Its application to the dual graph G of the Delaunay tetrahedral meshing computed at S20, with the application $\pi$ that associates to each edge belonging to the first open triangulated surface dual graph the swap permutation and to each other edge the identity permutation.

The reduction algorithm is described by the following pseudo-code

---
Algorithm 1: Lexicographic Min Valid Cut
---

Inputs: G = $(\mathcal{V}, \varepsilon, \pi)$ with $\varepsilon$ = {$e_i$, i = 1, ..., n} in decreasing order
Output: $\Gamma_{min}$ $\Gamma_{min} \leftarrow \emptyset$ for v $\in \mathcal{V}$ do
   MakeSet(v)
   $\mathcal{L}$(v) = b
End
for e $\in \varepsilon$ in decreasing order do
   e = $(v_1, v_2) \in \mathcal{V} \times \mathcal{V}$
   $r_1 \leftarrow$ FindSet($v_1$), $r_2 \leftarrow$ FindSet($v_2$)
   if $r_1$ = $r_1$ then
     if $\mathcal{L}(v_2) \neq \pi(e) (\mathcal{L}(v_1))$ then
       $\Gamma_{min} \leftarrow \Gamma_{min} \cup$ e
     End
   Else
     if $\mathcal{L}(v_2) \neq \pi(e) (\mathcal{L}(v_1))$ then
       SwapCC($r_2$)
     End
     UnionSet($r_1$, $r_2$)
end

---

The algorithm takes as input a set of edges sorted in decreasing order according to the lexicographic order. The operation SwapCC on the representative r of a connected component consists in swapping the label of all its elements, as in Remark 2 or in Lemma 2. Algorithm 2 visits edges in decreasing order for, which allows to build $\Gamma_{min}$ in quasi-linear time. Indeed, at the beginning, since $\Gamma_{min} = \emptyset$, any lexicographic minimal valid cut has to contain $\Gamma_{min}$. In fact this property remains valid at each step and, when considering next edge e, the union of the current $\Gamma_{min}$ with the set of edges smaller or equal than e is known to be a valid cut.

For this reason, the decision of inserting e in $\Gamma_{min}$ does not depend on the set of smaller edges in G. Note that this property, allowing to build $\Gamma_{min}$ in a single pass, uses the processing of the edges in decreasing order.

Proposition 1: Algorithm 1 computes the solution of Problem 1.3 for a given augmented graph $(\mathcal{V}, \varepsilon, \pi)$. Assuming the input set of edges $\varepsilon$ are sorted, the algorithm has O(n$\alpha$(n)) time complexity, where n is the cardinal of $\varepsilon$ and $\alpha$ the inverse Ackermann function.

Proof of Proposition 1:

While MakeSet, FindSet and UnionSet are standard operations on disjoint set data structures, a naive implementation of SwapCC would require an elementary operation on each element of the connected component. However, a variant of the disjoint set data structure allows to implement it with a quasi-constant time complexity.

One possibility for that is to implement the connected components by pairs of elementary connected components, with a map from elementary connected components, one "blue" and one "red" towards the pair containing it. The modified MakeSet operation creates then a such pair with one vertex in the blue component and one empty red component. The modified FindSet operation apply the standard FindSet operation and then return the pair containing it using the map. The modified UnionSet operation between two paired connected components applies the standard UnionSet operation on the respective "blue" and "red" elementary connected components and pairs the results in the new paired connected component. SwapCC consists then merely in swapping the "blue" and the "red" elementary connected components inside the paired connected component.

This manner of implementing the operations is convenient in practice as it uses the standard disjoint set data structure as a black box. However, the map from elementary connected components toward the pair containing it may add a log(n) factor to the complexity. The n$\alpha$(n) complexity of the disjoint set data structure can be preserved if one is willing to adapt its implementation. To briefly sketch this: One can attach an attribute in {ident, swap} to each "parent" relation, which is at the heart of the disjoint set data structure, without changing its complexity. This attribute expresses if a node and its parent have same or different color.

MakeSet creates a connected component with one element which is its own parent with the ident attribute associated to this relation. This attribute means that the color of the vertex, which is its own representative, is "blue". The FindSet operation need then to compose the permutation along the path, including the last relation from the representative to itself, that defines the color of the representative with respect to "blue": this determines the actual color of the node by applying this composition to the color "blue". UnionSet associates one representative to its parent with the attribute, ident or swap, required by their respective colors. SwapCC only swap the color of the representative, i.e. apply a swap to the attribute associated to the relation to itself as its own parent.

This proves proposition 1.

Algorithm 1 is now further discussed with reference to FIGS. 10 to 32, which show an example algorithm 1 running on the dual graph of a Delaunay triangulation. Each figures shows the algorithm together with an illustration of the current step of the algorithm on the dual graph, the current step being circled where appropriate in the figures.

Figure 10:
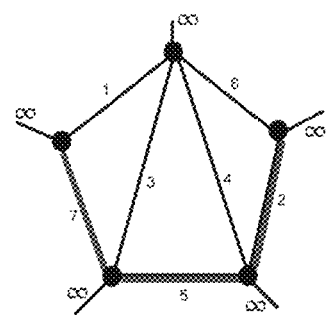

FIG. 10 shows a graphical representation of the Delaunay triangulation. The edges represent the triangles, and the bullet points connected by the edges represent the tetrahedrons. Edges ∞ represent the triangles each separating one tetrahedron from the outside of the triangulation. The remaining edges are numbered from 7 to 1, which corresponds to a decreasing rank of the triangle order: edge 7 represents the triangle with the higher rank in the triangle order, edge 6 represent the triangle with the second higher rank in the triangle order, and so on. Edges shown as large lines, that is edges 7, 5 and 2, represent the triangles of the first open triangulated surface. Algorithm 1 will find the lexicographic minimal path of triangles which as the same endpoints as the path formed by the triangles represented by edges 7, 5 and 2.

FIGS. 11 and 12 illustrate the dual graph of the triangulation illustrated on FIG. 10. On FIG. 11, the dual graph is superimposed with the triangulation, and on FIG. 12, the dual graph is shown alone. Edges of the dual graph are labelled with the same number than their corresponding triangles illustrated on FIG. 10.

Edges 7, 5 and 2, representing the triangles of the first open triangulated surface, are emphasized in FIG. 13, where they are shown as thick lines. This representation will be omitted in the next figures. Edges 7, 5 and 2 have been assigned the switch/swap permutation. The other edges have been assigned the identity permutation.

FIG. 14 illustrates the first step of the algorithm, where all the vertices of the dual graph are assigned with the same label "b". The other label is "r" and is assigned to no vertex yet. These vertices are represented by the large bullet points in FIG. 14. The solution $\Gamma_{min}$, which ultimately will contain all the dual edges of the triangles of the determined second open triangulated surface, is initialized as empty.

FIG. 15 illustrates the next step of the algorithm. The edges ∞ are first visited. They all respect the labelling consistency, as they all have been assigned the identity permutation while the vertices are at this step all assigned with label "b". The connected components of the dual graph separated by these edges are therefore merged, and these edges are not added to $\Gamma_{min}$.

Figure 17:
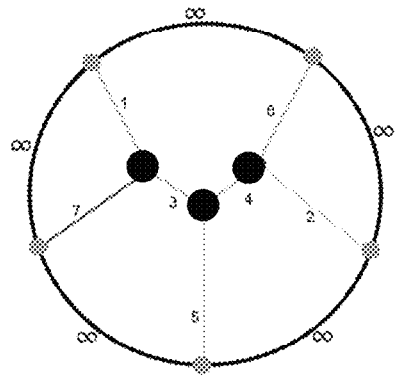

FIGS. 16 and 17 illustrate the next step of the algorithm. Edge 7 is now visited. Edge 7 is identified as violating consistency of the labelling, as Edge 7 is assigned with the swap permutation while it separates two tetrahedrons having the same label. Furthermore, Edge 7 separates two tetrahedrons belonging to two different connected components. As shown on FIG. 17, the label of one of the two connected components is thus swapped, and then the two connected components are merged. The swapping result in the labelling of vertices with the label "r", these vertices being illustrated by small grey bullet points in FIG. 17, and in the next figures. Edge 7 is not added to $\Gamma_{min}$. In other words, Edge 7 is discarded.

Figure 18:
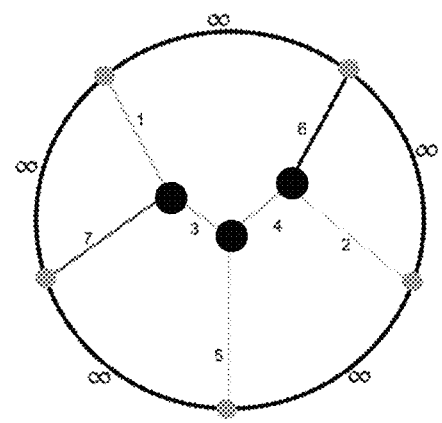
Figure 19:
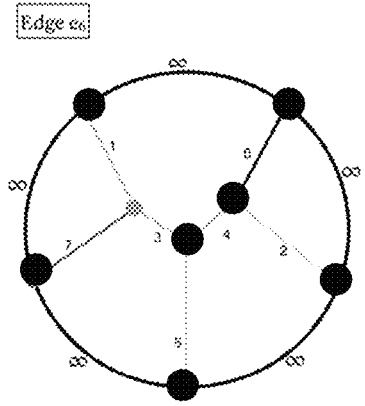

FIGS. 18 and 19 illustrate the next step of the algorithm. Edge 6 is now visited. Edge 6 is identified as violating consistency of the labelling, as Edge 6 is assigned with the identity permutation while it separates two tetrahedrons having different labels. Furthermore, Edge 6 separates two tetrahedrons belonging to two different connected components. As shown on FIG. 19, the label of one of the two connected components is thus swapped, and then the two connected components are merged. Edge 6 is not added to $\Gamma_{min}$. In other words, Edge 6 is discarded.

Figure 20:
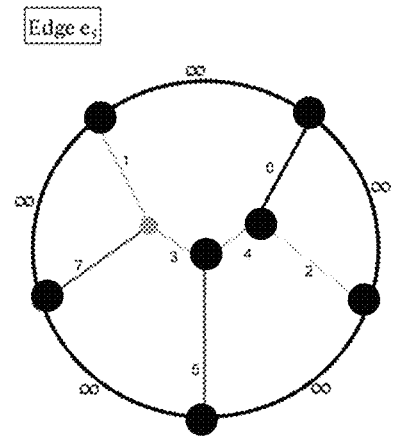
Figure 21:
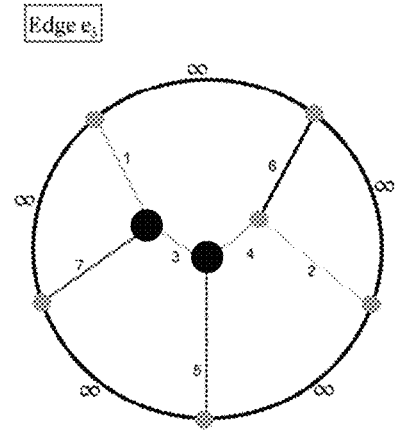

FIGS. 20 and 21 illustrate the next step of the algorithm. Edge 5 is now visited. Edge 5 is identified as violating consistency of the labelling, as Edge 5 is assigned with the swap permutation while it separates two tetrahedrons having the same label. Furthermore, Edge 5 separates two tetrahedrons belonging to two different connected components. As shown on FIG. 21, the label of one of the two connected components is thus swapped, and then the two connected components are merged. Edge 5 is not added to $\Gamma_{min}$. In other words, Edge 5 is discarded.

Figure 22:
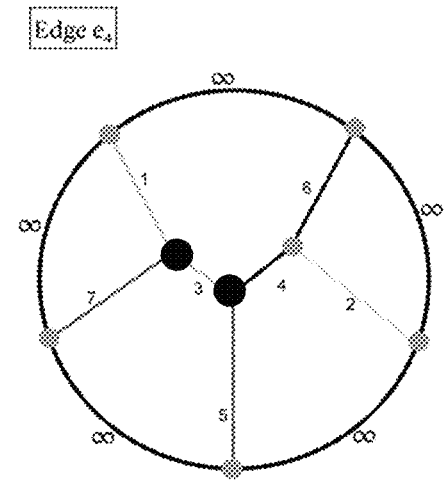

FIGS. 22 and 23 illustrate the next step of the algorithm. Edge 4 is now visited. Edge 4 is identified as violating consistency of the labelling, as Edge 4 is assigned with the identity permutation while it separates two tetrahedrons having different labels. Furthermore, Edge 4 separates two tetrahedrons belonging to a same connected component. As shown on FIG. 23, Edge 4 is thus added to the solution $\Gamma_{min}$ (represented by a cut of Edge 4 in FIG. 23). In other words, Edge 4 is rewarded.

FIG. 24 illustrates the next step of the algorithm. Edge 3 is now visited. Edge 3 is identified as not violating consistency of the labelling, as Edge 3 is assigned with the identity permutation while it separates two tetrahedrons having the same label. As shown on FIG. 24, Edge 3 is thus not added to the solution $\Gamma_{min}$. In other words, Edge 3 is discarded. The two tetrahedrons separates by Edge 3 are already in a same connected component.

Figure 25:
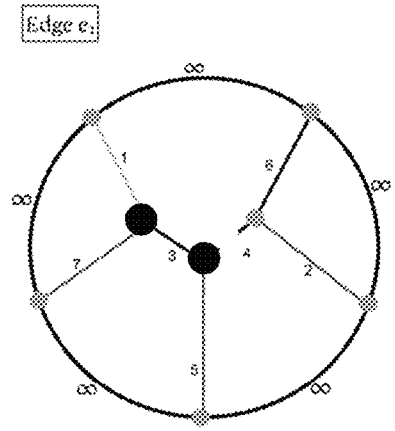
Figure 26:
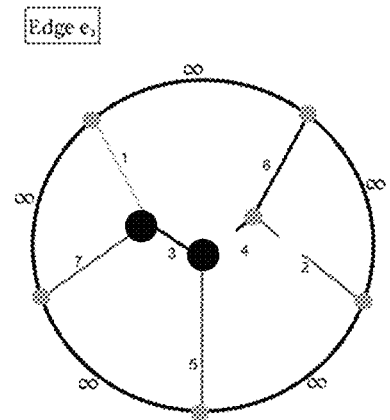

FIGS. 25 and 26 illustrate the next step of the algorithm. Edge 2 is now visited. Edge 2 is identified as violating consistency of the labelling, as Edge 2 is assigned with the swap permutation while it separates two tetrahedrons having the same label. Furthermore, Edge 2 separates two tetrahedrons belonging to a same connected component. As shown on FIG. 26, Edge 2 is thus added to the solution $\Gamma_{min}$ (represented by a cut of Edge 2 in FIG. 26). In other words, Edge 2 is rewarded.

Figure 27:
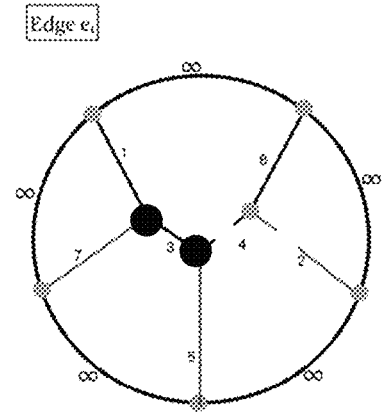
Figure 28:
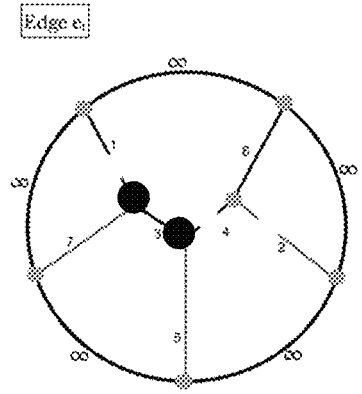

FIGS. 27 and 28 illustrate the next step of the algorithm. Edge 1 is now visited. Edge 1 is identified as violating consistency of the labelling, as Edge 1 is assigned with the identity permutation while it separates two tetrahedrons having different labels. Furthermore, Edge 1 separates two tetrahedrons belonging to a same connected component. As shown on FIG. 28, Edge 1 is thus added to the solution $\Gamma_{min}$ (represented by a cut of Edge 1 in FIG. 28). In other words, Edge 1 is rewarded.

FIG. 29 illustrates the end of the Algorithm: all the edges have been visited. FIG. 30 shows the output, which consists in the rewarded edges 4, 2 and 1. FIGS. 31 and 32 show the corresponding output triangles 4, 2 and 1. The output triangles are shown as thick black lines on FIGS. 31 and 32, and form the determined second open triangulated surface.

An algorithm for performing the determining S40 of the first open triangulated surface having the one or more loops as boundary is now discussed. The algorithm will be discussed for computing, given a 1-cycle A in a Delaunay complex of a point cloud in $\mathbb{R}^3$, a 2-chain $\Gamma_0$ in the Delaunay complex such that $\delta\Gamma_0 = A$. The Application of the Algorithm to the case where the Delaunay complex is the tetrahedral meshing (e.g. computed as S20) and where the 1-cycle is formed by the one or more loops provided at S30 implements the determining S40 of the first open triangulated surface.

Before further discussing this algorithm, Delaunay complex concepts are further discussed.

Delaunay Complex

The Delaunay complex Del(V) of a (finite) set of points $V \in \mathbb{R}^3$ is the simplicial complex made of tetrahedra, triangles, edges and vertices of the Delaunay triangulation of the convex hull of the point set, dual of the Voronoi diagram of V in Euclidean space $\mathbb{R}^3$. It is known (because of the nerve Theorem applied to the collection of full dimensional Voronoi cells for example) that the Delaunay complex Del(V) is contractible. It has trivial 1-homology, which means that any 1-cycle in Del(V) is the boundary of some 2-chain in Del(V).

The task that the algorithm is to carry out can be reformulated as follows. A set of edges A of the Delaunay complex such that each vertex of the complex is shared by an even number of edges in A, for example 0 or 2, this example occurring in many practical applications. The algorithm looks for a set of triangles $\Gamma_0$ such that any edge in A is shared by an odd number of triangles in $\Gamma_0$ (for example 1) and any edges not in A is shared by an even number of triangles in $\Gamma_0$ (for example 0 or 2). The fact that the Delaunay complex has trivial 1-homology means precisely that whatever A is chosen, a such $\Gamma_0$ exists. FIG. 8 illustrates a solution $\Gamma_0$ given a loop A in dimension 2.

Lower Link of a Vertex in the 3D Delaunay Complex

The link $lk_K(\tau)$ of a simplex $\tau$ in a simplicial complex K is the simplicial complex made of all simplices $\sigma \in K$ such that $\tau \cup \sigma \in K$ and $\tau \cap \sigma = \emptyset$.

Let Del(V) be the Delaunay complex of a set V of vertices in $\mathbb{R}^d$ such that no pair of vertices in V have same z coordinate. The lower link $llk_{Del(V)}(a)$ of a vertex $a \in V$ is the simplicial complex made of all simplices in the link $lk_{Del(V)}(a)$ whose vertices have all their z coordinates smaller than the z coordinate of a.

Figure 33:
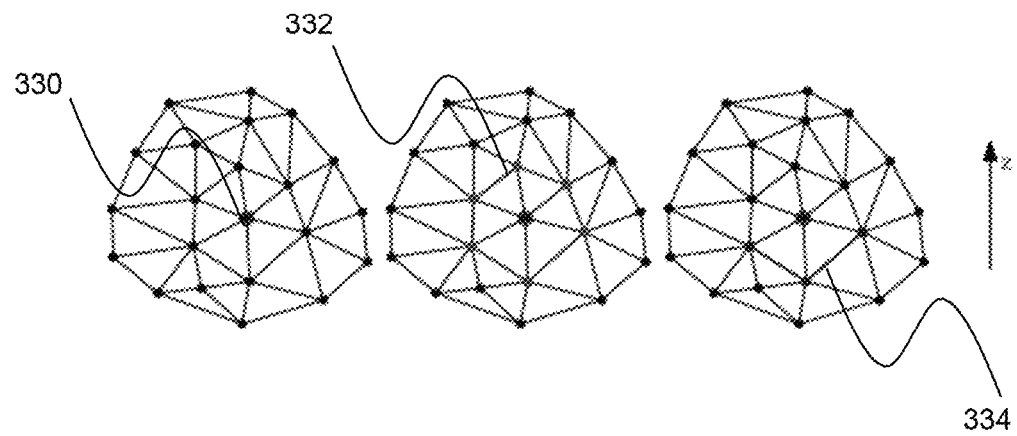

FIG. 33 shows the link 332 of a vertex 330, and the lower link 334 of vertex 330, with an axis indicating the z-coordinate.

When Del(V) is three-dimensional, the link $lk_{Del(V)}(a)$ and lower link $ll k_{Del(V)}(a)$ of vertex a are two-dimensional simplicial complex: each tetrahedron of Del(V) containing a gives rise to a triangle in $lk_{Del(V)}(a)$, each triangle of Del(V) containing a gives rise to an edge in $lk_{Del(V)}(a)$ and each edge of Del(V) containing a gives rise to a vertex in $lk_{Del(V)}(a)$. These triangles or edges belong to $llk_{Del(V)}(a)$ if and only if all their vertices have z coordinates smaller than the z coordinate $z_a$ of a.

Figure 34:
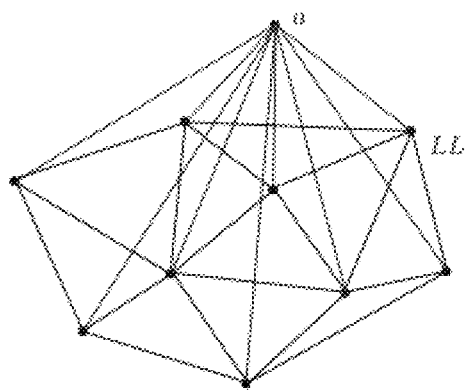

FIG. 34 illustrates the lower link LL of a vertex a.

As known per se a topological space and in particular a simplicial complex is said contractible if it has the homotopy type of a point. Notably, a contractible simplicial complex K is connected, which means that any pair of vertices in K can be connected by a path of edges in K. The algorithm implementing S40 integrates the fact that, in a Delaunay complex, the lower link of a vertex is either empty, either contractible. Specifically, the following lemma holds:

Lemma 3: Let Del(V) be the Delaunay complex of a set of vertices V in $\mathbb{R}^d$. Let z be the $d^{th}$ coordinate of a point in $\mathbb{R}^d$. Assume that no pair of vertices in V have same z. Let $a \in V$ and denote by $llk_{Del(V)}(a)$ the lower link of a in Del(V). Then:

the lower link $llk_{Del(V)}(a)$ is empty if and only if vertex a has minimal coordinate z in V,
if the z coordinate of a is not minimal in V then $llk_{Del(V)}(a)$ is contractible.

Proof of Lemma 3:

Denote by $z_a$, the z coordinate of a. By definition of Delaunay triangulation and of $lk_{Del(V)}(a)$, there is a one to one correspondence between the vertices in $l k_{Del(V)}(a)$ and the (possibly unbounded) facets contributing to the boundary of the Voronoi cell of a.

By definition, a vertex v with z coordinate $v_z$ is in the lower link of a if and only if its Voronoi cell has a common boundary with the Voronoi cell of a and $v_z < z_a$. It follows that the Voronoi cell of a is contained in the half space containing a and bounded by the plane bisector of a and v. It follows that a such vertex exists if and only if the vertical half-line starting at a and pointing toward negative z is not contained in the Voronoi cell of a. One sees that the vertical half-line starting at a and pointing toward negative z is contained in the Voronoi cell of a if and only if a has minimal z in V and the first statement is proven.

The lower envelope of the Voronoi cell of a is the union of the facets dual to a vertex in the lower link of a. When this lower envelope is not empty, its projection on the horizontal plane is a homeomorphism with a convex two dimensional polytope. This lower envelope is therefore contractible. Since the lower link of v is the nerve of the set of facets in the lower envelope of the Voronoi cell the second statement in the lemma follows then from the nerve theorem.

This proves lemma 3.

The algorithm for computing a 2-chain for a given boundary in the three-dimensional Delaunay complex, implementing S40, is now discussed.

The algorithm is described by the following pseudo-code:

---

Algorithm 2: Finding a set of triangles for a given boundary

---

Inputs: Del(V) a Delaunay complex and $A_0$ a set of edges in Del(V) with zero boundary
Output: $\Gamma_0$ a set of triangles in Del(V) such that $\partial \Gamma_0 = A_0$
$\Gamma_0 \leftarrow \emptyset$
$A \leftarrow A_0$
while $A \neq \emptyset$ do
   $\alpha \leftarrow$ GetHighestVertex(A)
   LL $\leftarrow$ GetLowerLink($\alpha$, Del(V))
   $V_\alpha \leftarrow$ GetAdjacentVertices($\alpha$, A)
   for $v \in V_\alpha$ do
     $A \leftarrow A + \alpha \vee v$
   End
   E $\leftarrow$ GetEdgesConnecting($V_\alpha$, LL)
   for $e \in E$ do
     $A \leftarrow A + e$
     $\Gamma_0 \leftarrow \Gamma_0 + \alpha \vee e$
   End
End

---

In other words, given a 2-cycle $A_0$, Algorithm 2 computes a 2-chain $\Gamma_0$ such that $\delta \Gamma_0 = A_0$. Zero chains or cycles are denoted by the set theoretic expression "$\emptyset$" instead of the algebraic "0" because the practical implementation manipulates sets rather than vectors. However, the addition modulo 2 is denoted by "+" to avoid the somewhat heavy disjoint union notation. For example the algebraic expression: $A \leftarrow A + e$ stands for the set theoretic expression: $A \leftarrow (A \cup \{e\}) \setminus (A \cap \{e\})$.

Principles and Correctness of Algorithm 2

Principles and correctness of algorithm 2 are now discussed with reference to FIGS. 35 to 37, which illustrate the algorithm. $\Gamma_0$ is initialized as the empty set and A is initialized as $A_0$. If A is empty, the algorithm returns. If not, the procedure GetHighestVertex(A) returns a, the highest vertex in A, which is the one with the maximal z coordinate.

Since A is a cycle, its boundary is zero by definition. As illustrated on FIG. 35, It follows that an even number of edges of A connects a with a set $V_a$ of vertices in the lower link $\text{llk}_{Del(V)}(a)$ of a in Del(V) returned by the procedure GetAdjacentVertices(a, A).

Since a is the highest vertex in V, the vertices in $V_a$ are below a and connected to a by an edge: it follows that $V_a$ is a subset of vertex of the lower link $\text{ll k}_{Del(V)}(a)$. This set is not empty and, since A is a cycle, it has even cardinality. The procedure GetLowerLink(a, Del(V)) returns the 1-skeleton LL of the lower link of a in Del(V), in other words the graph whose vertex and edges are vertex and edges of the lower link, as illustrated on FIG. 35.

Figures 35, 36, 37:
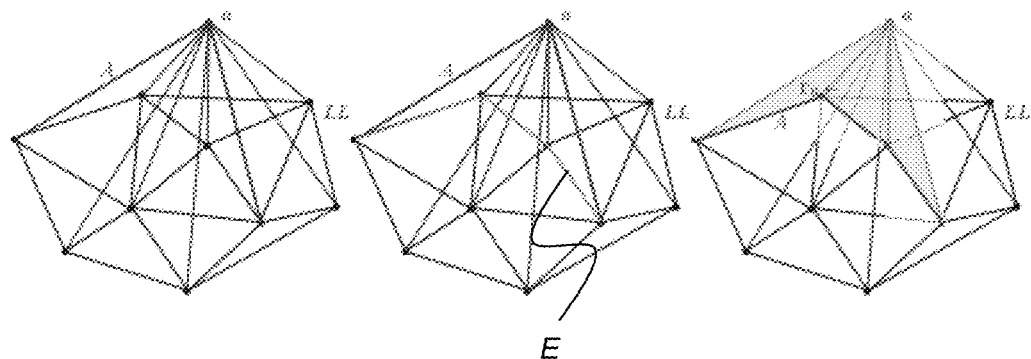

The main step of algorithm 2 consists then in replacing this even number of edges by edges connecting a to vertices in $V_a$ by paths E=GetEdgesConnecting($V_a$, LL) (as shown in FIG. 36) in $\text{llk}_{Del(V)}(a)$ connecting pairs of vertices in $V_a$ and adding, for each edge e in these paths, the corresponding triangle a\/e in $\Gamma_0$ (represented as hatched in FIG. 37).

FIG. 37 shows the updated A cycle after the main step. After each step of the algorithm, the following property is preserved:

$$\partial \Gamma_0 = A_0 + A \quad (2)$$

Indeed, during the step, the following 2-chain is added to $\Gamma_0$:

$$\sum_{e \in E} a \vee e. \quad (3)$$

The boundary of (3) can be evaluated as:

$$\partial \left( \sum_{e \in E} a \vee e \right) = \sum_{e \in E} \partial (a \vee e) = \sum_{e \in E} e + a \vee \partial e = E + a \vee \partial E.$$

Since by definition of E=GetEdgesConnecting($V_a$, LL) one has $\partial E = V_a$, and $E = \sum_{e \in E} e$, one gets:

$$\partial \left( \sum_{e \in E} a \vee e \right) = \partial a \vee \sum_{e \in E} e + a \vee \partial \sum_{e \in E} e = E + a \vee \partial E = E + \alpha \vee V_a \quad (4)$$

Since the right hand side of (4) is precisely the chain added to A during the step, (2) is proven. Since, from (2), A is initialized to 0 and is updated by the boundary of (3). A remains a cycle at each step.

As long as A is not empty, it must contain at least 2 vertices. Therefore its highest vertex a cannot be the lowest vertex in Del(V) and Lemma 3 asserts then that its lower link LL is non-empty and contractible, the precondition for the procedure GetEdgesConnecting($V_a$, LL).

Since, after each step, the z coordinate of the highest vertex in A decreases, the algorithm must terminate, with A=∅ and (2) gives then $\delta\Gamma_0 = A_0$ as required.

Procedure GetHighestVertex(A)

This one requires to maintain an ordered map on the evolving set of vertices of the edges in A. If n is the size of Del(V), since each vertex of Del(V) can only be inserted once, the total cost of all the call to the procedure is O(n log n).

Procedure GetLowerLink(a, Del(V))

Procedure GetLowerLink(a, Del(V)) returns the 1-skeleton LL of the lower link of a in Del(V), in other words the graph whose vertex and edges are vertex and edges of the lower link, as illustrated on FIG. 35. Since no two vertex of Del(V) have same z coordinates, one can define the following total order on edges in Del(V). Each edge in Del(V) can be represented by the ordered pair of vertex $(v_1, v_2)$ such that $z(v_1) > z(v_2)$. Then one can define the following total order on the edges of Del(V):

$$(v_1, v_2) \leq (v'_1, v'_2) \underset{def}{\Leftrightarrow} z(v_1) > z(v'_1)$$

$$\text{or } v_1 = v'_1 \text{ and } z(v_2) \geq z(v'_2).$$

In other words, $(v_1, v_2) \leq (v'_1, v'_2)$ means that either $v_1$ is strictly higher than $v'_1$, either $v_1 = v'_1$ and $v_2$ is strictly higher than $v'_2$. Sorting all edges along this order (or, equivalently, inserting them in an ordered set data structure) costs O(n log n) where n is the size of Del(V). Observe that the set of vertices of the lower link $\text{llk}_{Del(V)}(a)$ of a vertex a is in one-to-one correspondence with the set of ordered pairs whose first vertex is a. Theses pairs in the form (a, .) are contiguous in the ordered set.

Similarly, each triangle in Del(V) can be represented by the ordered triple of vertex $(v_1, v_2, v_3)$ such that $z(v_1) > z(v_2) > z(v_3)$ and one can define the following total order on the triangles of Del(V):

$$(v_1, v_2, v_3) \leq (v'_1, v'_2, v'_3) \underset{def}{\Leftrightarrow} z(v_1) > z(v'_1)$$

$$\text{or } v_1 = v'_1 \text{ and } z(v_2) > z(v'_2))$$

$$\text{or } v_1 = v'_1 \text{ and } v_1 = v'_1 \text{ and } z(v_3) > z(v'_3).$$

Again, sorting all triangles along this order (or, equivalently, inserting them in an ordered set data structure) costs O(n log n) where n is the size of Del(V). As previously, the set of edges of the lower link $\text{llk}_{Del(V)}(a)$ of a vertex a is in one-to-one correspondence with the set of ordered triples whose first vertex is a. These triples in the form (a, ., .) are contiguous in the ordered set of triples.

It can be observe that this construction shows that the set of all vertices of all lower links is in one-to-one correspondence with the edges of Del(V), and that the set of all edges of all lower links are in one-to-one correspondence with the triangles in Del(V), so that the sum of the sizes of 1-skeletons of all lower links is upper bonded by the size n of Del(V).

It follows that, after a preprocessing step that produces the ordered sets of edges and triangles with cost O(n log n), each call to the procedure GetLowerLink costs log(n) to find the entries in the ordered sets of edges and triangles, and the vertices and edges of $\text{llk}_{Del(V)}(a)$ follow then contiguously in the respective ordered sets whose sizes are upper bounded by n. The total cost of GetLowerLink is then O(n log n).

Procedure GetAdjacentVertices(a, A)

If A is given as a set of edges, i.e. a set of vertex pairs, then it is possible to associate to each vertex the set of its neighbors in time linear with respect to the size of A. since, along the updates of A in the algorithm, each edge may only be inserted once, maintaining theses neighbors relation costs at most O(n log n). Since GetAdjacentVertices(a, A) is called at most once for each vertex a∈V, and the sum of all numbers of neighbors of all vertices is twice the number of edges (each edge connect two vertices), the total cost of GetAdjacentVertices is bounded by O(n log n).

Procedure GetEdgesConnecting($V_a$, LL)

This procedure requires as a precondition that the number of vertices in $V_a$ is even and that the graph LL is connected.

Denote by m the size of the lower link LL. A possibility would be to compute a path for each pair of vertices, for example by Dijkstra Algorithm in O(m log m) or by a recursive exploration in O(m) (the paths do not need to be minimal) and then add (modulo 2) all these paths. However, even if this solution is likely to be efficient in practice, it would not give an optimal worst case complexity. Indeed, in a particular case where the lower link of the highest vertex $a_0$ contains all the other vertices (m=n−1) and A connects $a_0$ to 2 k vertices in LL we need to compute k paths in LL with a cost km, so that, if k=m/2=(n−1)/2 which gives a cost quadratic in n.

It is now discussed a O(m) algorithm for GetEdgesConnecting that preserves the global O(n log n) complexity for Algorithm 2.

In fact, procedure GetEdgesConnecting is similar to the global algorithm with one dimension less: giving a 0-cycle $V_a$, find a 1-chain E such that $\partial E = V_a$. However there is no immediate induction here. In order to apply a similar algorithm, one need first to define an order on vertices for which all lower links of vertices are contractible except one who is empty.

In order to get this order we first compute a spanning $ST_{LL}$ tree of LL, which is possible since it is connected. Since $ST_{LL}$ is connected, E can be found inside $ST_{LL}$. Computing $ST_{LL}$ can be done in time O(m) using a recursive exploration of LL that assigns a parent field to each vertex. For that one can pick an arbitrary vertex as the root, mark it as "visited", assigns its parent field to "NULL" and push it on a stack. Then, while the stack is not empty, one pops the top vertex v from it, and for all its neighbors that are not marked visited, one assigns the "parent" field to v, mark them as visited and push them on the stack. Along the same process, preserving the O(m) complexity, one can assign an integer rank to each vertex such that the root has rank 0 and each non root vertex has a rank higher than its parent. For example one can increment a counter each time a vertex is marked "visited" and assign the counter value as rank of the vertex.

The situation is then similar to that of Lemma 3 where the height z is replaced by the vertex rank. Indeed each vertices which is not the root has as lower link in $ST_{LL}$ a single vertex: its unique parent node in $ST_{LL}$. This lower link is then contractible. The lower link of the root is empty. Starting from $ST_{LL}$ it is now presented another algorithm, algorithm 3, where m'≤m is the number of vertices in the tree T=$ST_{LL}$. Algorithm 3 finds a set of edges for a given boundary in a tree.

Algorithm 3 is described by the following pseudo-code

Algorithm 3: Finding a set of edges for a given boundary in a tree

Inputs: T a tree and $V_0$ an even set of vertices in T represented by a membership array
Output: E a set of edges in T such that ∂E = V0
E ← ∅
V ← $V_0$
for rank ← m' − 1, 1 do
   α ← Vertex(rank)
   if α ∈ V then
     p ← GetParentInTree(α, T)
     V ← V + α + p
     E ← E + α V p
   End
End Algorithm 3 is similar to Algorithm 2, but with one dimension less. The procedure GetHighestVertex(V) is not necessary here.

Indeed, the for loop, iterating from the vertex of highest rank, m'−1, to the vertex with rank 1 gives the required highest vertex that belongs to V, where the highness z is replaced by the rank of the vertex. The for loop ends at rank 1, because, since at each step V contains an even number of vertices and Vertex(rank) is the highest vertex in V, this highest vertex cannot be Vertex(0).

If an array of size m contains all vertices indexed by their rank, each call to the procedure Vertex(rank) costs O(1). If the evolving set of vertex V is represented by an array of booleans of size m, where entry k indicates the membership to V of the vertex with rank k, the membership predicate a∈V costs O(1). When V is updated, updating this membership array can be done also in time O(1). It follows that each line in the algorithm costs O(1). For this reason, the cost of Algorithm 3 is O(m')=O(m) instead of O(m log(m)). The proof of correctness is similar to the proof of correctness of Algorithm 2: it is based on the fact that the following property is preserved along the algorithm:

$$\partial E = V_0 + V \quad (5)$$

Overall, the following lemma is proved:

Lemma 4: Given a Delaunay complex Del(V) of size n and an 1-cycle (a set of edges with zero boundary) $A_0$ in Del(V), Algorithm 2 computes $\Gamma_0$ a 2-chain (a set of triangles) in Del(V) such that $\partial \Gamma_0 = A_0$ in time O(n log n).

As previously explained, algorithms 1 and 2 may implement steps S40 and S50 of the method. In this case, the lexicographic order is based on a total order on the triangles, i.e. the triangle order, which is now further discussed.

Simplicial Ordering

Denote by $R_B(\sigma)$ the radius of the smallest enclosing ball and $R_C(\sigma)$ the radius of the circumcircle of a 2-simplex σ. A total order can be defined on 2-simplices as follows:

$$\sigma_1 \leq \sigma_2 \Leftrightarrow \begin{cases} R_B(\sigma_1) < R_B(\sigma_2) \\ \text{or } R_B(\sigma_1) = R_B(\sigma_2) \text{ and } R_C(\sigma_1) > R_C(\sigma_2) \end{cases}$$

Under generic condition on the position of points, it can be shown that this order is total. The lexicographic order $\sqsubseteq_{lex}$ is induced by this order on simplices. The following proposition can be proven and shows a strong link between the simplex ordering and the 2D Delaunay triangulation:

Proposition 2: Let P=$P_1$, . . . , $P_N \subset \mathbb{R}^2$ with N≥3 be in general position and let $K_P$ be any 2-dimensional complex containing the Delaunay triangulation of P. Denote by $\beta_P \in C_1(K_P)$ the 1-chain made of edges belonging to the boundary of convex hull $\mathcal{CH}(P)$. If $\Gamma_{min} = \min_{\sqsubseteq_{lex}} \{\Gamma \in C_2(K_P), \partial \Gamma = \beta_P\}$, the simplicial complex $|\Gamma_{min}|$ support of $\Gamma_{min}$ is the Delaunay triangulation of P.

Examples of applications of the method where the previously-discussed implementation has been used are now discussed.

A first application of the method where the previously-discussed implementation has been used is now discussed, with reference to FIGS. 38 to 41.

This first application allows to mesh a partial acquisition, i.e. to determine an open triangulated surface representing a skin of a portion of a structure of a real scene where the real-scene is partially represented by a point cloud resulting from a partial acquisition, e.g. featuring holes. The first application lies in contexts where physical constraints in real-world scenes (e.g. occlusions and/or optical properties of surfaces) can lead to partial and incomplete 3D acquisitions. In these contexts, it can be challenging to offer an accurate and hole-free mesh reconstruction. By taking as input one or more 3D paths (i.e. the loops) which define the boundary of surface to reconstruct, the method guarantees hole-free meshes and offers high quality reconstructions, even for noisy acquisitions. In this first application, the one or more loops are defined by a user as previously discussed.

Figures 38, 39, 40:
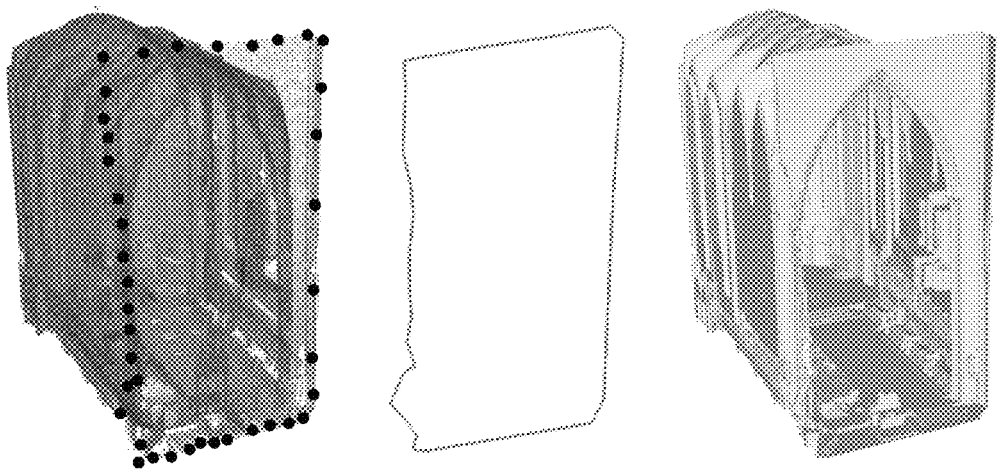

FIGS. 38 to 40 illustrate an example of the first application. In the example shown in these figures, the real scene is a building scene, comprising a cathedral structure. The 3D point cloud represents partially the structure of the cathedral. It is to be understood that the cathedral is an example, and that the first application also applies to any other building scene. The 3D point cloud shown in FIG. 38 comprises 943K points.

As shown on FIG. 38, the user interactively picks an ordered list of points that roughly defines the boundary of the desired surface. The list user-picked points are represented by large bullet points on FIG. 38. The boundary might then be oversampled, such that all edges on the boundary are present in the 3D triangulation of points. FIG. 39 shows the oversampled boundary from the user-picked list of points. The method then efficiently meshes the point cloud under the imposed boundary, i.e. determines an open triangulated surface forming the skin of a portion of the cathedral (i.e. a delimitation between the walls of the cathedral and the air outside and inside the walls. FIG. 40 shows the determined skin, obtained in 18 seconds.

Figure 41:
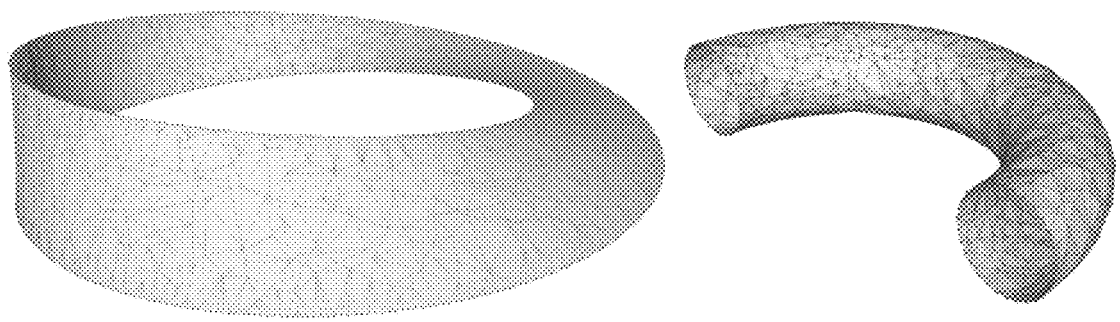

FIG. 41 shows two other examples of open triangulated surfaces determined at step S50 by the method under imposed boundaries.

Figure 42:
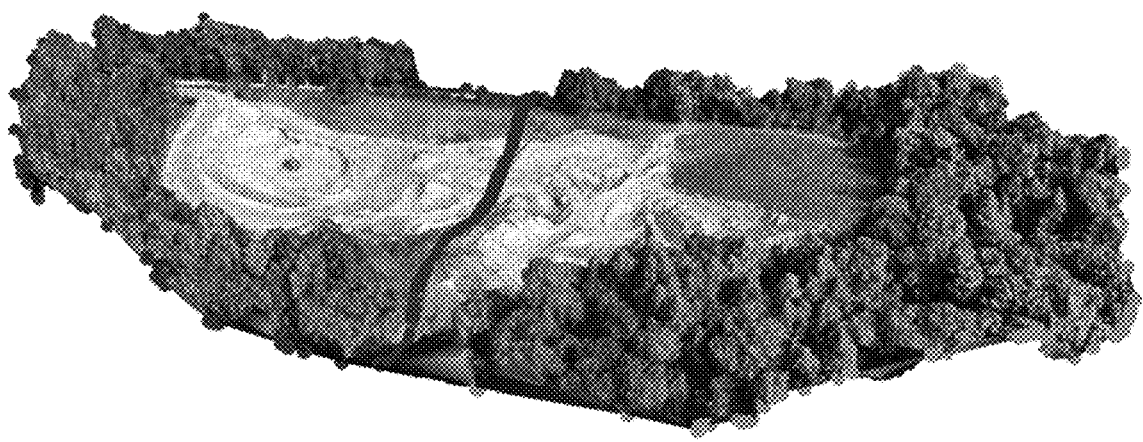

A second application of the method where the previously-discussed implementation has been used is now discussed, with reference to FIG. 42. This second application lies in the context of large scene meshing, as well as parallelizing and updating large scene meshes. Modern acquisition techniques can generate precise and copious amount of measurements. As the perimeter of acquisition gets larger, the storage capacity—RAM or disk—required to hold all measurements at the same time can become a limiting factor to meshing these large scenes. For example, a standard or cheap computer is limited by a 16 Gigabytes memory, which is may be too small for point clouds having more than 10 M point.

The method circumvents these difficulties by using spatial tiling to divide acquisitions into smaller chunks. Furthermore, the method guarantees that the junction between two meshes on neighboring tiles is common. Indeed, the method allows specify the cycle bounding the resulting open triangulated surface. In other words, the one or more loops provided at step S30 (e.g. by a user or automatically, as previously discussed) allow to divide the scene in smaller chunks having watertight common junctions.

Furthermore, local mesh edits can be performed efficiently, by defining the boundary of the region affected by changes and recomputing the open triangulated surface inside the affected region. The rest of the open triangulated surface does not require to be recomputed and the junction with the affected region will correspond exactly with the rest of the open triangulated surface.

FIG. 42 illustrate the second application. FIG. 42 shows a large point cloud representing a terrain, meshed into two parts thanks to the definition of boundaries (i.e. loops). The loops are represented by bullet points in FIG. 42. In other words, an open triangulated surface is determined at step S50 for each region/parcel of the terrain defined as having a given loop as boundary. Imposing the boundary by defining the loops creates a common junction between the two meshes shown on FIG. 42.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 43:
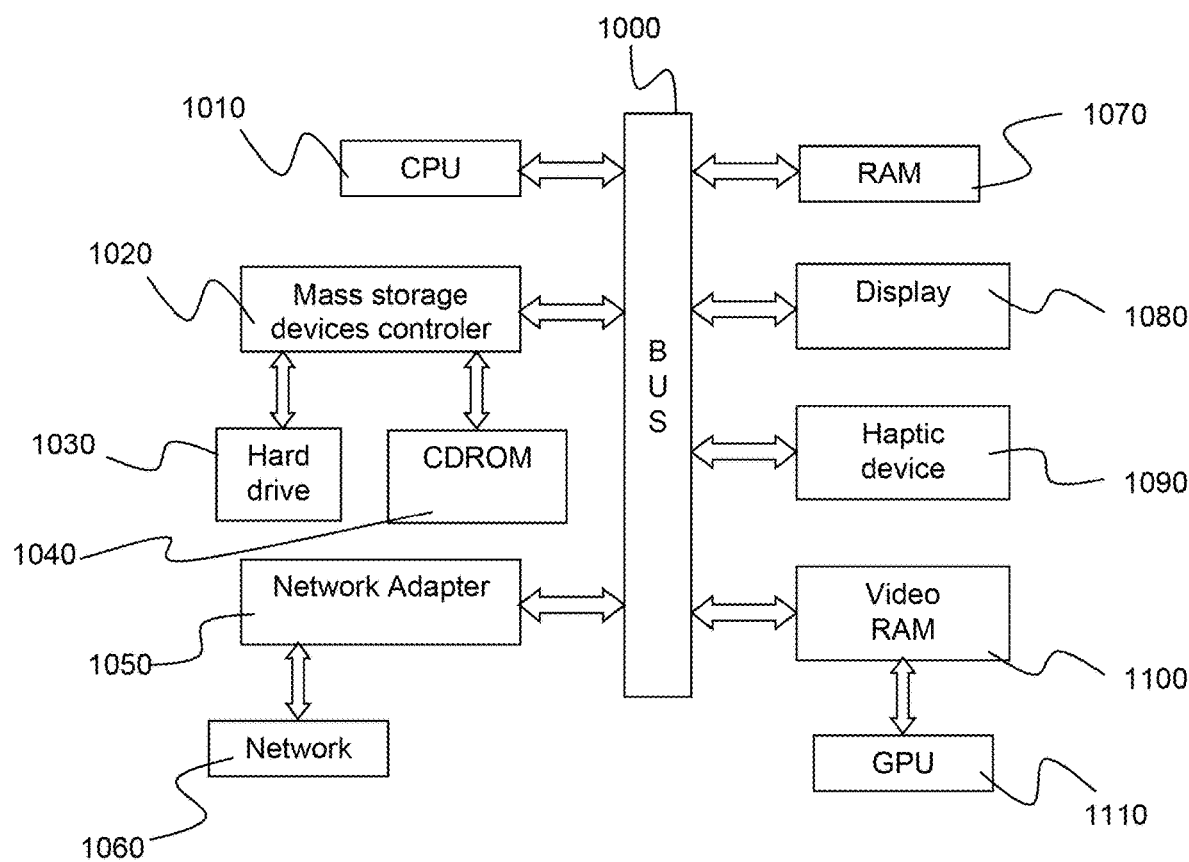
FIG. 43 shows an example of the computer.

FIG. 43 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer-implemented method for 3D reconstruction of a structure of a real scene, the method comprising:
    obtaining a first open triangulated surface, the first open triangulated surface being a set of triangles of a tetrahedral meshing of a 3D point cloud representing at least a part of a structure; and
    determining a second open triangulated surface representing a skin of a portion of the structure, the determining exploring candidate open triangulated surfaces each being a set of triangles of the tetrahedral meshing and the determining penalizing a high rank of the candidate open triangulated surfaces according to a lexicographic order, the lexicographic order being based on a triangle order and the lexicographic order ordering a first candidate open triangulated surface having first triangles which are ordered according to a decreasing rank of the triangle order, relative to a second candidate open triangulated surface having second triangles which are ordered according to a decreasing rank of the triangle order, the triangle order penalizing a triangle size, the determined second open triangulated surface violating consistency of a labelling of the tetrahedral meshing with two given labels, a triangle respecting consistency of the labelling when the triangle belongs to the first open triangulated surface and separates two tetrahedrons having different labels, or when the triangle does not belong to the first open triangulated surface and separates two tetrahedrons having a same label,
    wherein the tetrahedral meshing presents the following properties:
    a union of the tetrahedrons of the tetrahedral meshing forms a convex envelop of the points of the 3D point cloud; and
    the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron.

2. The computer-implemented method of claim 1, wherein the triangle order penalizes, for a respective triangle, a high value of a radius of the smallest enclosing circle.

3. The computer-implemented method of claim 2, wherein the triangle order further penalizes, for a first triangle and a second triangle having a same smallest enclosing circle, a small value of a radius of a circumscribed circle.

4. The computer-implemented method of claim 1, wherein the tetrahedral meshing is a regular triangulation.

5. The computer-implemented method of claim 1, wherein the exploring and the penalizing comprise:
    visiting triangles of the tetrahedral meshing according to a decreasing rank of the triangle order; and
    discarding visited triangles having a high rank of the triangle order as long as consistency of the labelling can be preserved.

6. The computer-implemented method of claim 5, wherein the discarding comprises, for each visited triangle, when the triangle violates consistency of the labelling, either rewarding the triangle, either adapting the labelling to respect consistency.

7. The computer-implemented method of claim 6, wherein the discarding further comprises, for each visited triangle:
    when the triangle separates two tetrahedrons that are in a same connected component and the triangle violates consistency of the labelling, rewarding the triangle;
    when the triangle separates two tetrahedrons that are in different connected components:
    when the triangle violates consistency of the labelling, switching the label of one of the connected components and merging the connected components, and
    when the triangle respects consistency of the labelling, merging the connected components.

8. The computer-implemented method of claim 1, wherein the obtaining of the first open triangulated surface comprises:
    obtaining one or more loops in the tetrahedral meshing; and
    determining an open triangulated surface in the tetrahedral meshing having the one or more loops as boundary.

9. The computer-implemented method of claim 1, wherein the structure comprises at least one corner structure.

10. The computer-implemented method of claim 1, wherein the 3D point cloud stems from photogrammetry, laser-scan, lidar measurements, RGB-D measurements and/or medical or industrial tomography or the 3D point cloud represents a portion of a closed shape, and/or a ratio between a number of points of the 3D point cloud and a memory size of the computer is larger than a predefined threshold.

11. A non-transitory computer readable storage medium having recorded thereon a computer program comprising instructions for performing a method for 3D reconstruction of a structure of a real scene, the method comprising:
    obtaining a first open triangulated surface, the first open triangulated surface being a set of triangles of a tetrahedral meshing of a 3D point cloud representing at least a part of a structure; and
    determining a second open triangulated surface representing a skin of a portion of the structure, the determining exploring candidate open triangulated surfaces each being a set of triangles of the tetrahedral meshing and the determining penalizing a high rank of the candidate open triangulated surfaces according to a lexicographic order, the lexicographic order being based on a triangle order and the lexicographic order ordering a first candidate open triangulated surface having first triangles which are ordered according to a decreasing rank of the triangle order, relative to a second candidate open triangulated surface having second triangles which are ordered according to a decreasing rank of the triangle order, the triangle order penalizing a triangle size, the determined second open triangulated surface violating consistency of a labelling of the tetrahedral meshing with two given labels, a triangle respecting consistency of the labelling when the triangle belongs to the first open triangulated surface and separates two tetrahedrons having different labels, or when the triangle does not belong to the first open triangulated surface and separates two tetrahedrons having a same label, wherein the tetrahedral meshing presents the following properties:

a union of the tetrahedrons of the tetrahedral meshing forms a convex envelop of the points of the 3D point cloud; and the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron.

12. The non-transitory computer readable storage medium of claim 11, wherein the triangle order penalizes, for a respective triangle, a high value of a radius of the smallest enclosing circle.

13. The non-transitory computer readable storage medium of claim 12, wherein the triangle order further penalizes, for a first triangle and a second triangle having a same smallest enclosing circle, a small value of a radius of a circumscribed circle.

14. The non-transitory computer readable storage medium of claim 11, wherein the tetrahedral meshing is a regular triangulation.

15. A computer comprising:

a processor coupled to a memory, the memory having recorded thereon a computer program comprising instructions for 3D reconstruction of a structure of a real scene that when executed by the processor causes the processor to be configured to:

obtain a first open triangulated surface, the first open triangulated surface being a set of triangles of a tetrahedral meshing of a 3D point cloud representing at least a part of a structure, and determine a second open triangulated surface representing a skin of a portion of the structure, the determination exploring candidate open triangulated surfaces each being a set of triangles of the tetrahedral meshing and the determining penalizing a high rank of the candidate open triangulated surfaces according to a lexicographic order, the lexicographic order being based on a triangle order and the lexicographic order ordering a first candidate open triangulated surface having first triangles which are ordered according to a decreasing rank of the triangle order, relative to a second candidate open triangulated surface having second triangles which are ordered according to a decreasing rank of the triangle order, the triangle order penalizing a triangle size, the determined second open triangulated surface violating consistency of a labelling of the tetrahedral meshing with two given labels, a triangle respecting consistency of the labelling when the triangle belongs to the first open triangulated surface and separates two tetrahedrons having different labels, or when the triangle does not belong to the first open triangulated surface and separates two tetrahedrons having a same label, wherein the tetrahedral meshing presents the following properties:

a union of the tetrahedrons of the tetrahedral meshing forms a convex envelop of the points of the 3D point cloud; and the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron.

16. The computer of claim 15, wherein the triangle order penalizes, for a respective triangle, a high value of a radius of the smallest enclosing circle.

17. The computer of claim 16, wherein the triangle order further penalizes, for a first triangle and a second triangle having a same smallest enclosing circle, a small value of a radius of circumscribed circle.

* * * * *